US008797663B1

(12) United States Patent
Bouckaert

(10) Patent No.: US 8,797,663 B1
(45) Date of Patent: Aug. 5, 2014

(54) METHOD AND APPARATUS FOR SELECTIVE FILTERING OF AN ILLUMINATION DEVICE

(75) Inventor: Anton M. Bouckaert, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 13/233,860

(22) Filed: Sep. 15, 2011

(51) Int. Cl.
*G02B 5/22* (2006.01)
*G02B 7/00* (2006.01)

(52) U.S. Cl.
USPC ............................ 359/889; 359/891; 359/892

(58) Field of Classification Search
None
See application file for complete search history.

(56) References Cited

U.S. PATENT DOCUMENTS

| | | | |
|---|---|---|---|
| 5,695,272 A | 12/1997 | Snyder et al. | |
| 5,882,107 A * | 3/1999 | Bornhorst et al. | 362/281 |
| 6,068,385 A | 5/2000 | Hsieh | |
| 6,962,423 B2 | 11/2005 | Hamilton et al. | |
| 7,331,692 B2 * | 2/2008 | Baiardi et al. | 362/322 |
| 7,518,133 B2 | 4/2009 | Giffen et al. | |

OTHER PUBLICATIONS

Revue Thommen AG Product Presentation: Thommen HSL 1600 (Apr. 14, 2011).
Press Release, "Revue Thommen displays the HSL-1600 helicopter searchlight," http://www.shephard.co.uk/news/rotorhub/revue-thommen-displays-the-hsl-1600-helicopter-searchlight/8146/ (Jan. 20, 2011).
Press Release, "Revue Thommen Displays the HSL-1600 Helicopter Searchlight at ALEA in New Orleans," http://www.rotorpad.com/manufacturers/revue-thommen-displays-the-hsl-1600-helicopter-searchlight-at-alea-in-new-orleans.html (Jul. 20, 2011).
"Signal lamp," 2 pages, http://enwikipedia.org/wiki/Signal_lamp (Dec. 21, 2007).
"Instructions and Renewal Parts Model 24-G-20 24-Inch Searchlight Navy Department Contract NXs-4296," General Electric, Schenectady, NY, 47 pages, http://www.hnsa.org/doc/searchlight24/index.htm (Apr. 1944).
Web page featuring "HeliLight 1®," by Universal Searchlights, LLC, http://www.universalsearchlights.com/helilight.html (2009).
Product literature for "Trakkabeam®—M800," by Trakka Corp. Pty. Ltd., http://www.trakkacorp.com/tc/pdf/M800Brochure2006 (2009).
Product literature for "Trakkabeam®—M500," by Trakka Corp. Pty. Ltd., http://www.frakkacorp.com/tc/pdf/M500Brochure2006.pdf (2009).
Product literaure for Trakkabeam® A800, by Trakka Corp.Pty. Ltd., http://www.trakkacorp.com/tc/pdf/a800brochure2006.pdf (2009).
Product literaure for Trakkabeam® A800, by Trakka Corp.Pty. Ltd., http://www.trakkacorp.com/tc/pdf/A800Brochure2010_letter.pdf.

\* cited by examiner

*Primary Examiner* — Jade R Chwasz
(74) *Attorney, Agent, or Firm* — Clifford G. Cousins

(57) ABSTRACT

A filter for an illumination device may include wedge-shaped lenses arranged about an opening of the illumination device and pivotable between open and closed positions. When pivoted to a closed position, the lenses substantially cover the illumination device opening and block or filter radiation emitted therefrom. When pivoted to an open position, the lenses lie substantially perpendicular to the plane of the illumination device opening, allowing radiation emitted from the illumination device to pass through the opening unfiltered. In one aspect, the filter may include radially inner and outer supports, and each lens element may be pivotally attached to, and pivot about a radially extending pivot axis extending between, the inner and outer supports.

11 Claims, 27 Drawing Sheets

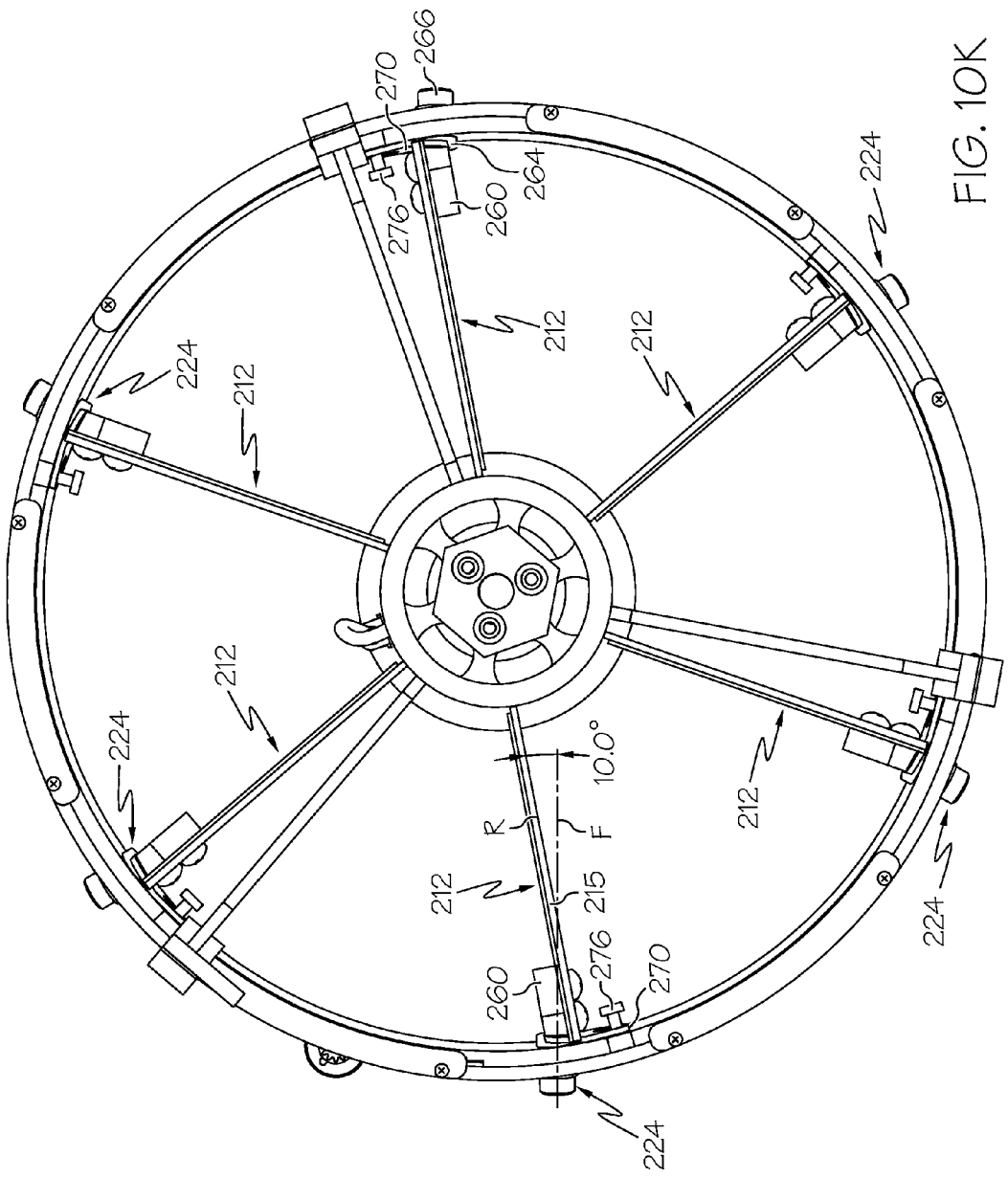

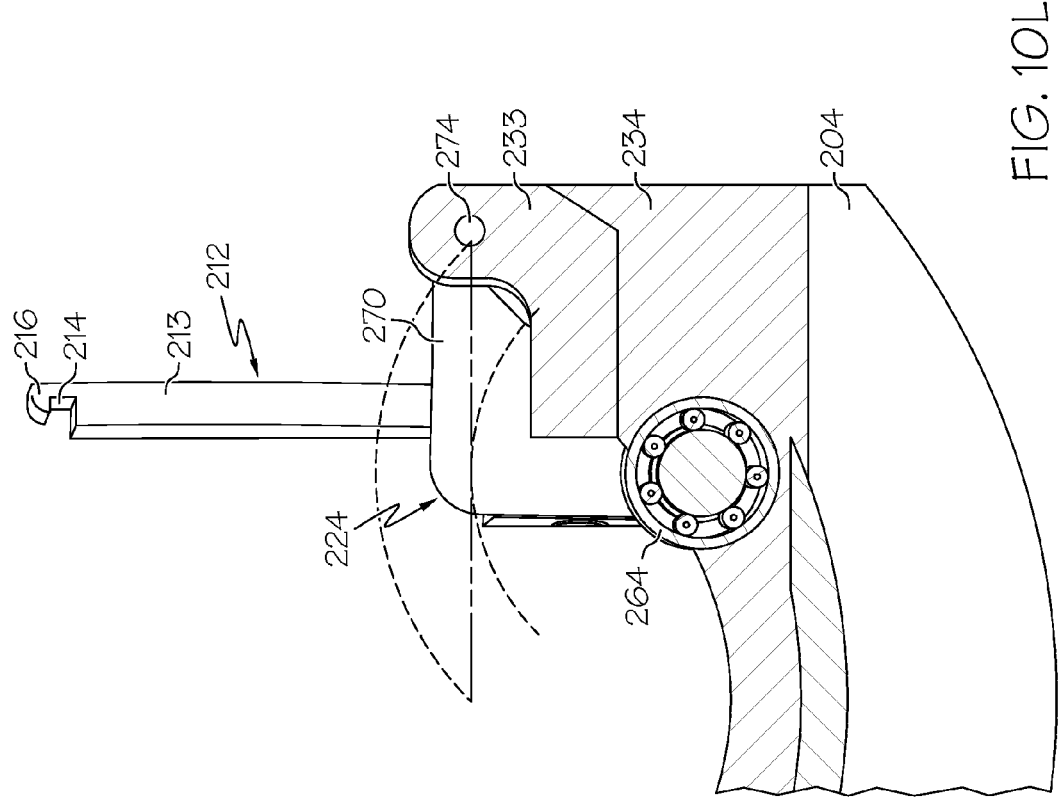

METHOD AND APPARATUS FOR SELECTIVE FILTERING OF AN ILLUMINATION DEVICE

BACKGROUND

The present disclosure relates to illumination devices, and more particularly, to a method and apparatus for selectively filtering an illumination device.

Vehicles, such as aircraft, may have lights mounted thereon for providing illumination during take-off, landing, or during search operations. Lights also may be useful for identifying aircraft or providing primary or supplemental lighting during operation of the aircraft in adverse conditions, including night operations, rain, and other particle storms. Alternatively, searchlights may be hand held or used in a smaller configuration, such as a flashlight, headlamp or night vision imaging device.

With the advent of night vision imaging systems for covert military operations, a need arose for landing lights, searchlights, and portable light sources that were compatible with night vision equipment by producing infrared light. While this need may be met by providing separate sets of infrared and visible spectrum lights, single light sources that may be converted between infrared and visible illumination have been developed.

One method of early lighting systems that were convertible between visible and infrared light utilized an infrared a filter that was selectively placed over a visible light the searchlight. Using such filters is cumbersome because of the difficulty in attaching and removing the filter. This limitation restricted the usefulness and applicability of lights equipped in this manner by limiting flights either to visible light or infrared light.

Lighting systems have been developed that include a lamp that has both visible and infrared filaments that allow an operator to switch between the two. Additional controls permit the lamp head to be extended, retracted, and rotated by electrical relays and a selector switch. An example of this design is described in U.S. Pat. No. 5,695,272 to Snyder et al.

Such designs provide significant advantages, including the ability to switch between infrared and visible light spectrums from within the cockpit, thereby eliminating the need to remove and replace an infrared filter manually to switch illumination modes. However, such lamps do not emit light at the same intensity as a dedicated infrared or visible light system because the bulb surface is divided between infrared and visible light filtering covers.

U.S. Pat. No. 6,962,423 to Hamilton et al. describes another multi-mode visible and infrared light head for use as a landing light or searchlight. That patent describes an illumination source having two separate diodes, one for emitting infrared and the other for emitting visible light, spaced apart in a searchlight, with each diode having its own reflector and lens cover. However, that arrangement also limits the amount of light that may be transmitted from the searchlight by dedicating a portion of the light-producing elements either to the infrared or to the visible spectrums.

Another dual mode searchlight is described in U.S. Pat. No. 7,518,133 to Giffen et al. That patent discloses an integrated searchlight light head having separate infrared and visible light illumination sources, each positioned within a reflector. The reflectors are merged and separated by an insulating material and air gap that provide cooling of the illumination sources. The merged reflector assembly provides improved light distribution over previous light sources. However, the merged reflectors are inferior to a single reflector and the combination of separate lighting elements reduces the intensity of the light that may be produced.

There is a need for an improved method and apparatus for filtering light emitted by an illumination device, such as a searchlight, capable of selectively switching the illumination device between infrared and visible light. There is also a need for an improved filtering apparatus that can be switched easily between infrared and visible illumination modes without modifying the searchlight housing or reflector. Further, there is a need for a multi-mode filter with improved light distribution and efficiency.

SUMMARY

The disclosure is directed to a method and apparatus for selectively filtering radiation emitted from an illumination device. The apparatus may include a filter having a lens that may be configured either to transmit, for example, infrared radiation and block visible light emitted from the illumination device, or to allow all radiation, for example visible light and infrared radiation, to be emitted from a single illumination source of the illumination device.

The disclosed filter may comprise a plurality of lenses, each lens configured to rotate about an axis, the axes being substantially planar and radially extending from a common origin.

The disclosed filter may be used with a searchlight or other illumination device of a type having a light source and a reflector that focuses light emitted from the light source to provide a beam of light. In one aspect, the filter may include a composite lens made up of discrete lenses arranged about the opening of the illumination device, and the filter may include supports for mounting the lenses for pivotal movement between open and closed configurations. The filter may include an actuator to pivot the lenses between the open and a closed positions.

According to other aspects, the lenses may be wedge-shaped and positioned to overlap one another when in the closed position. The lenses also may be positioned to lie substantially parallel to radiation projected from the associated illumination device when in the open position, and pivot to lie in a plane substantially perpendicular to radiation projected from the illumination device when in the closed position. In another aspect, the lenses may be shaped to collectively form a disc that lies in the plane and surrounds a central baffle of the associated illumination device. The lenses may be supported to pivot about axes that are both inclined relative to the plane and make an angle relative to a radius of the disc. Angling the pivot axes in such a manner may provide clearance between the lenses and the inner walls a reflector of an associated illumination device.

The present disclosure also describes a method for selectively filtering a beam of substantially collimated radiation emitted from an illumination source. The method includes the steps of providing a lens in the beam, the lens having a plurality of lenses made of a material that is substantially transparent to a first selected type of radiation in the beam, and is substantially opaque to a second selected type of radiation in the beam; pivoting the lenses to a closed position such that the lenses are substantially perpendicular to the beam and the beam passes through the lenses and is filtered thereby; and pivoting the lenses to an open position such that the lenses are substantially parallel to the beam such that the radiation does not pass through said lenses and is not filtered thereby.

The method may be used in combination with a searchlight of a type having a light source and a reflector for directing radiation from the light source into a collimated beam. The method may include providing and inner and outer supports, and lenses being positioned to extend between the inner and outer supports and supported thereby for pivotal movement. The method may include providing an actuator for selectively pivoting the lenses between open and closed positions to selectively filter the light emitted from the searchlight.

The features, functions, and advantages of the disclosed method and apparatus will be apparent from the following description, the accompanying drawings and the appended claims.

BRIEF DESCRIPTION OF THE DRAWINGS

FIG. 10I is a detail of the pivot assembly of the embodiment of FIG. 10A;

FIG. 10K is a plan view of the filter of FIG. 10A, showing a lens pivot angle; and FIG. 10L is a detail, partially in section, of a pivot of the embodiment of FIG. 10A, pivoted to the open position.

DETAILED DESCRIPTION

Figure 1A:
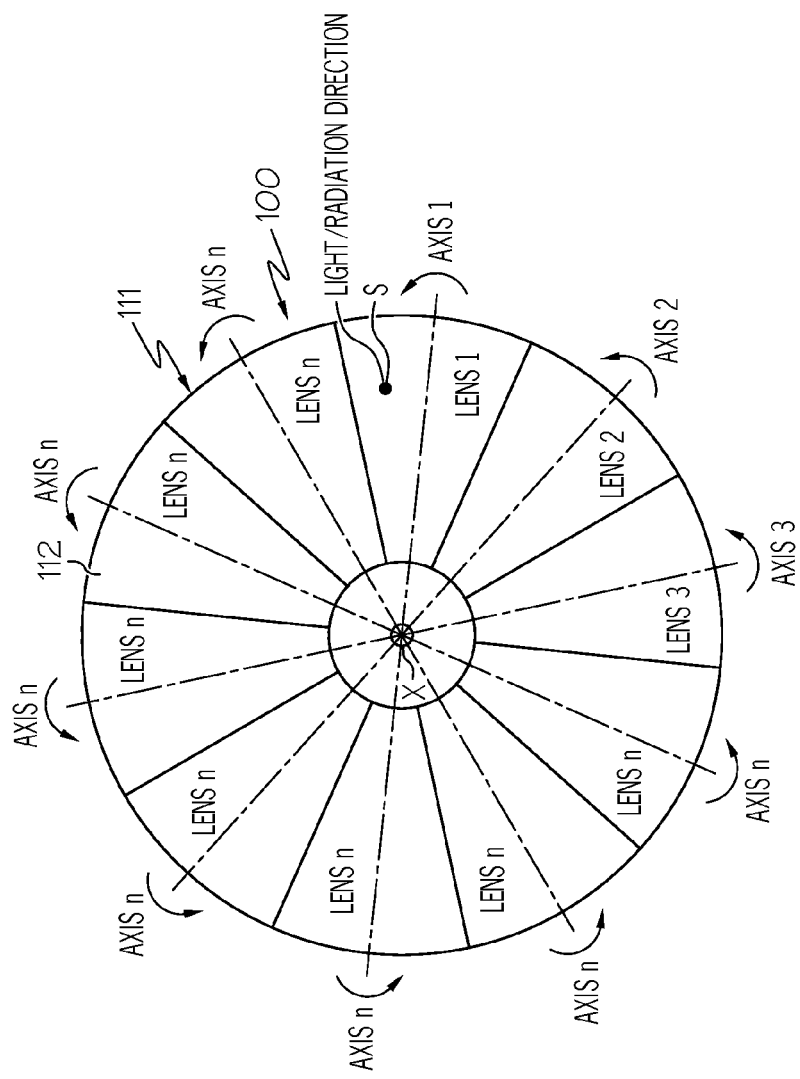
FIG. 1A is a schematic top view of an embodiment of the disclosed filter showing the relationship between the radially extending axes and the lenses in a closed position.
Figure 1B:
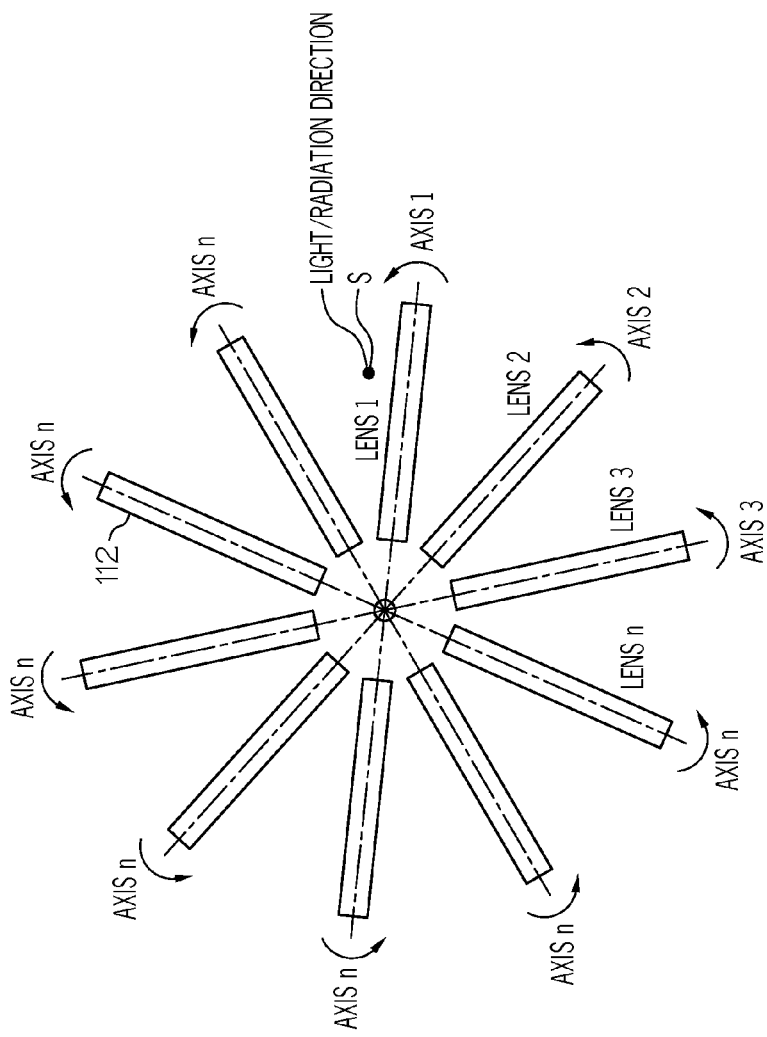
FIG. 1B is a schematic top view of the filter of FIG. 1A showing the relationship between the radially extending axes and the lenses in an open position.

As shown in FIGS. 1A and 1B, the disclosed filter, generally designated 100, may include a composite lens 111 that may be made up of lenses 112. Each lens 112 may be associated with an axis n extending from a common origin x. Each lens 112 may be configured to rotate about its associated axis n from a first closed position (FIG. 1A) to a second, open position (FIG. 1B). In a preferred embodiment, the axes n are substantially co-planar and may be evenly distributed 360 degrees about the common origin x such that when closed, the lenses 112 form a substantially planar composite lens 111 in the shape of a ring. When the lenses 112 are in a closed position (FIG. 1A), the ring is substantially orthogonal to an emittance of radiation generated from light source s. When the lenses 112 are in an open position (FIG. 1B), the lenses are substantially parallel to an emittance of radiation generated from light source s.

Figure 2:
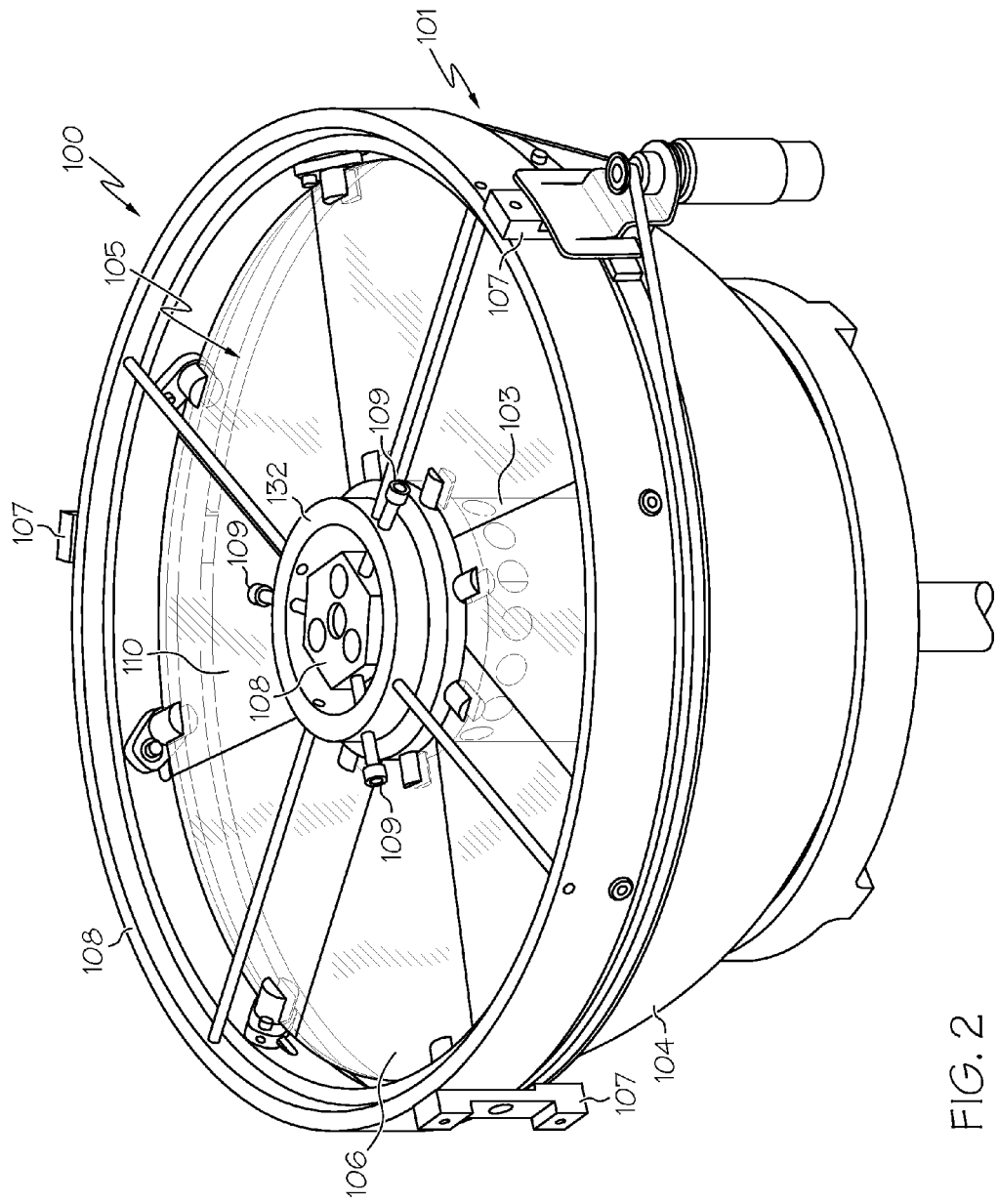
FIG. 2 is a perspective view of an embodiment of the disclosed filter, shown mounted on a searchlight.
Figure 3A:
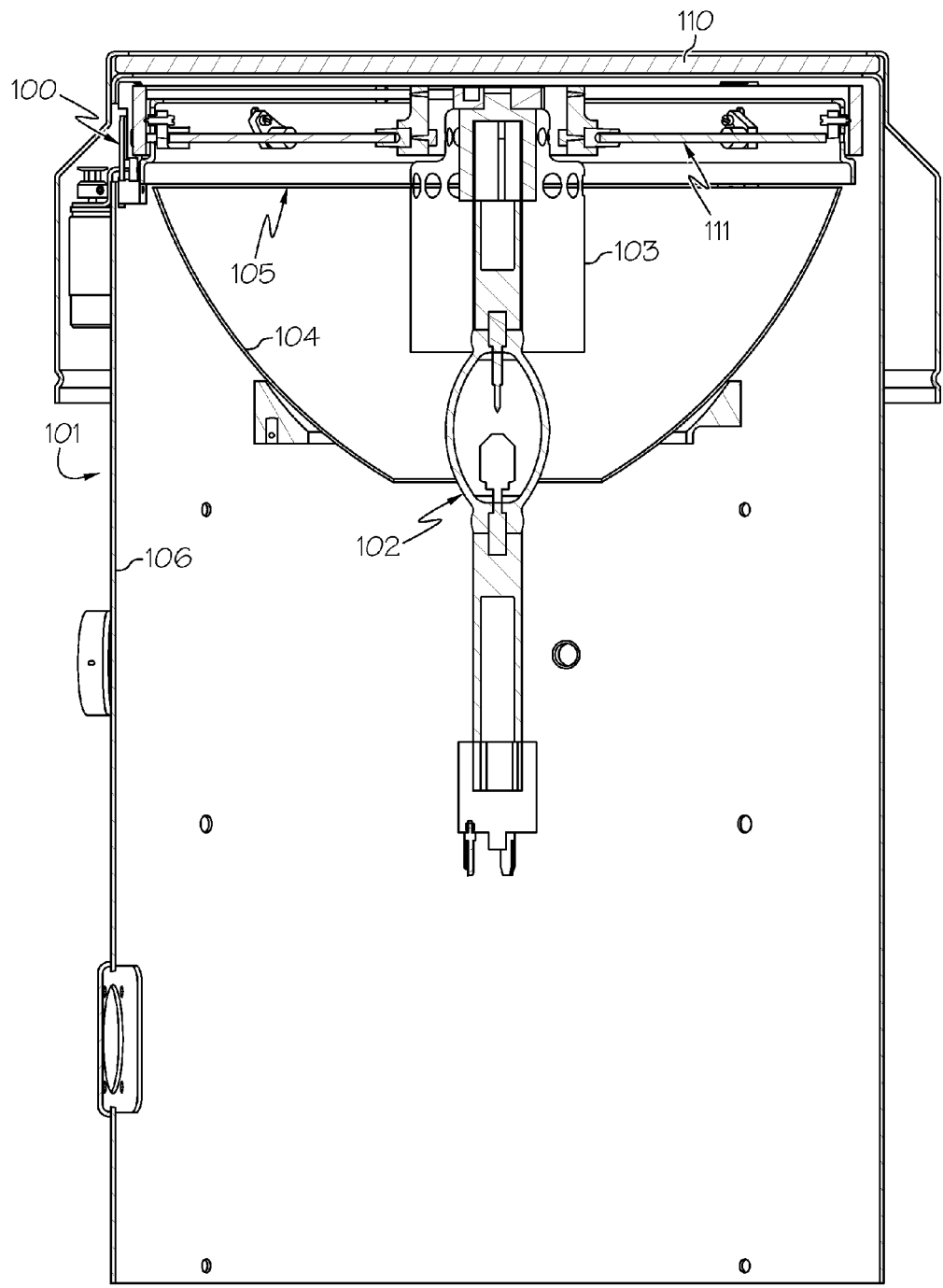
FIG. 3A is a side elevation in section of the filter and searchlight of FIG. 1, mounted within a searchlight housing.

As shown in FIGS. 2 and 3A, in one aspect the disclosed filter 100 is adapted to be mounted on an illumination device, such as a searchlight, generally designated 101. The searchlight 101 may include an illumination source 102, a cylindrical baffle 103, and a reflector 104 for directing radiation emitted from the illumination source 102 through a periphery defining an exit opening 105. The searchlight may include a housing 106 that encloses the illumination source 102, baffle 103 and reflector 104. The housing 106 also may support the filter 100 above the reflector 104 (as oriented in FIGS. 1 and 2) by mounting brackets 107 extending between the filter and housing.

The illumination source 102 may include a cathode 108 that is positioned substantially in the center of the exit opening 105. The filter 100 may be centered relative to the electrode 108 by set screws 109. The housing 106 also may include a protective lens 110 that covers the exit opening 105 and encloses the filter 100.

While the filter 100 is shown and described as used in combination with a searchlight 101, it is to be understood that the filter may be used with other types of illumination devices, such as aircraft landing lights and other vehicle-mounted lights, without departing from the scope of the invention. Also, while the filter is described as filtering a light source 102 that emits a spectrum of electromagnetic radiation that includes visible light, it is within the scope of the invention to utilize an illumination source that may emit other types of electromagnetic radiation.

The reflector 104 may be parabolic in shape to convert radiation emitted from the light source 102 into a collimated beam extending perpendicular to the plane of the opening 105. The position of the light source 102 also may be adjustable within the reflector 104 to convert the light from a collimated beam either to a converging beam or a diverging beam.

Figure 3B:
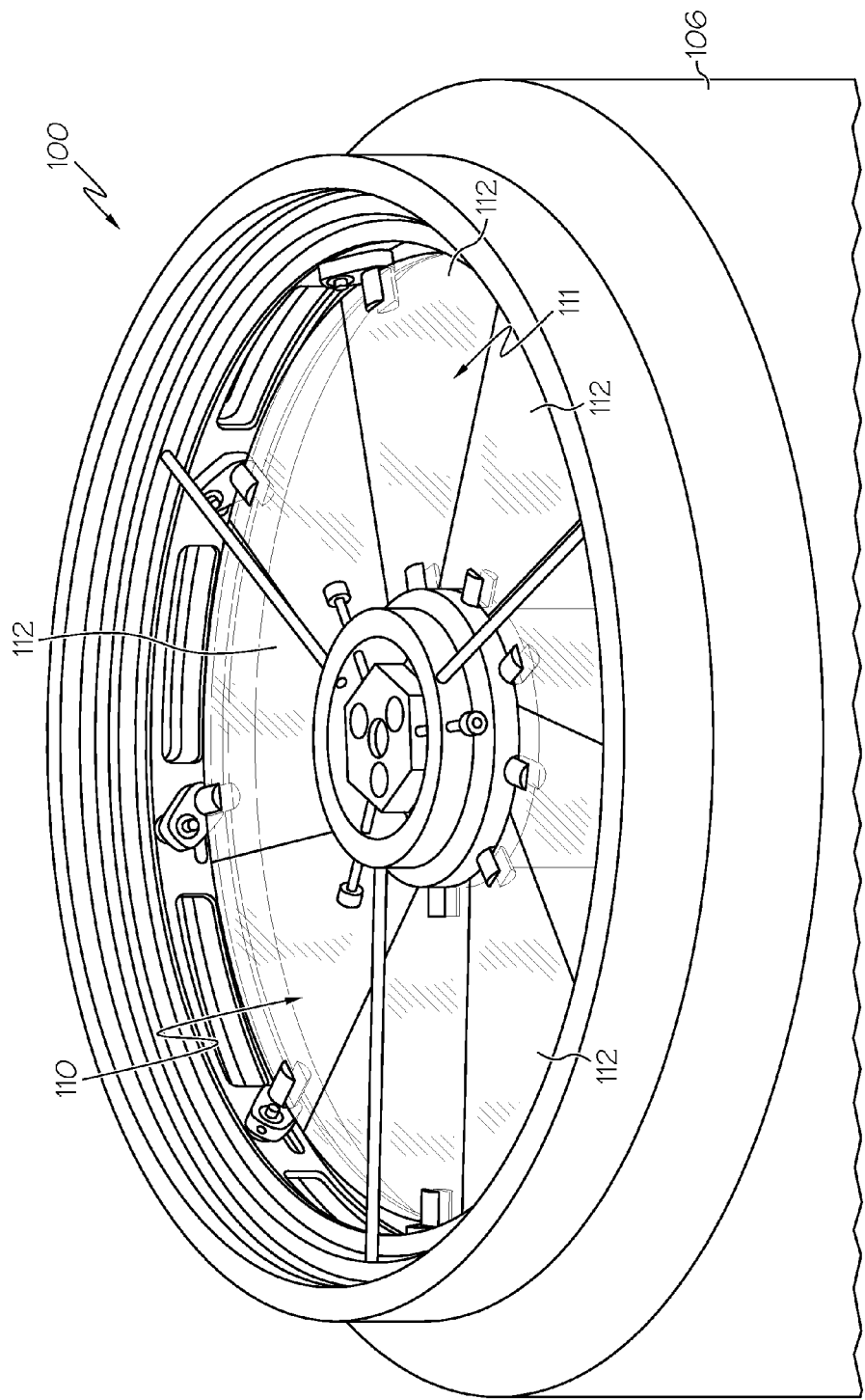
FIG. 3B is a detail in perspective of the filter and searchlight of FIG. 1, in which the filter is in a closed position.
Figure 3C:
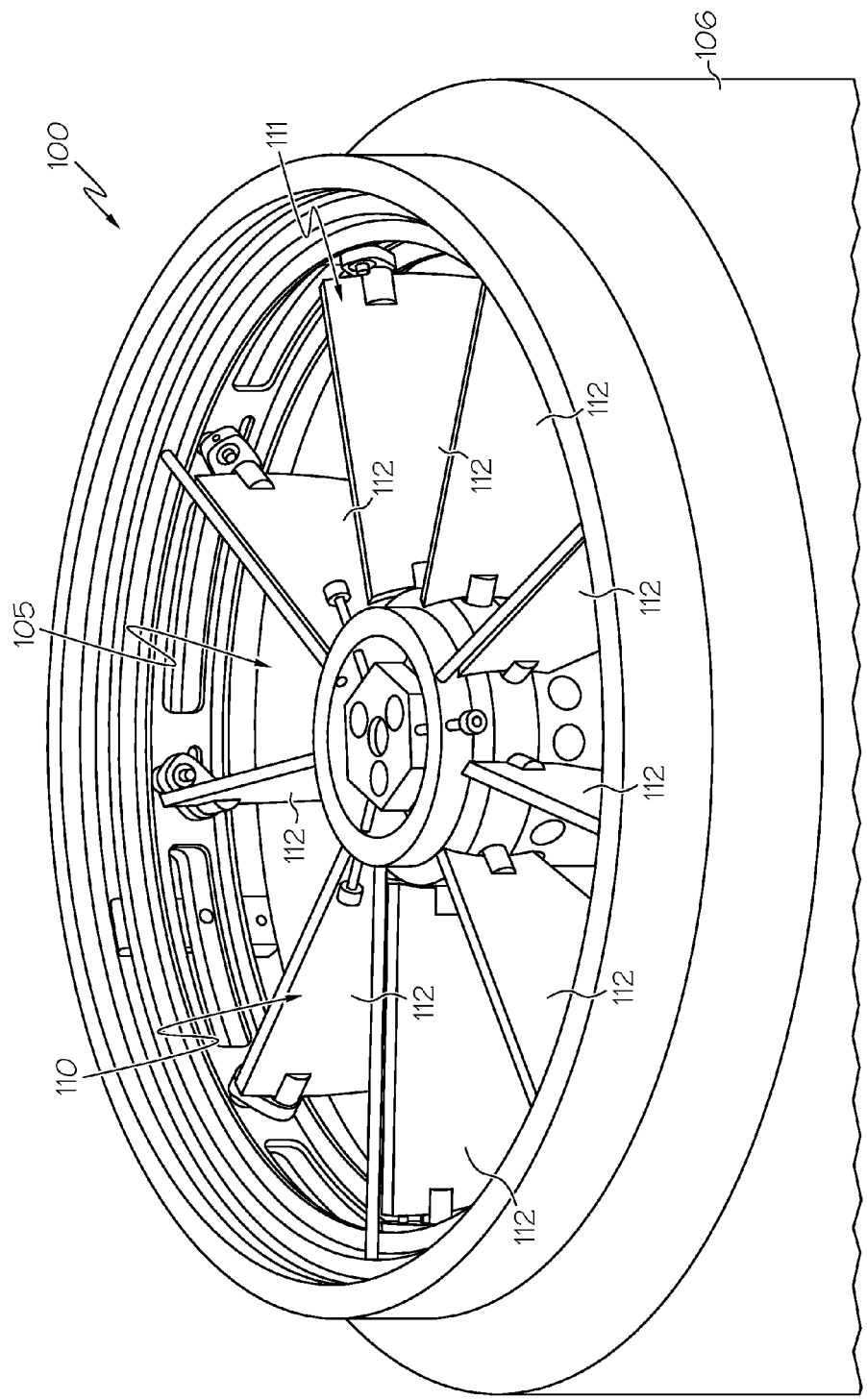
FIG. 3C is a detail in perspective of the filter and searchlight of FIG. 1, in which the filter is in an open position.

As shown in FIGS. 3A-C, the filter 100 may be selectively engaged to be mounted over the exit opening 105 to filter emitted radiation reflected through the exit 105 by the reflector 104. The filter 100 may include a composite lens 111 in which the lenses 112 are pivotally mounted and are shaped and positioned as to overlap and substantially cover the opening 105 to filter substantially all radiation passing through the opening. FIG. 3B shows the filter 100 where lenses 112 are pivoted to a closed position, in which substantially all radiation leaving the searchlight 101 is filtered. FIG. 3C shows the filter 100 in which the lenses 112 are pivoted to an open position in which emitted radiation is substantially unfiltered.

Figure 4:
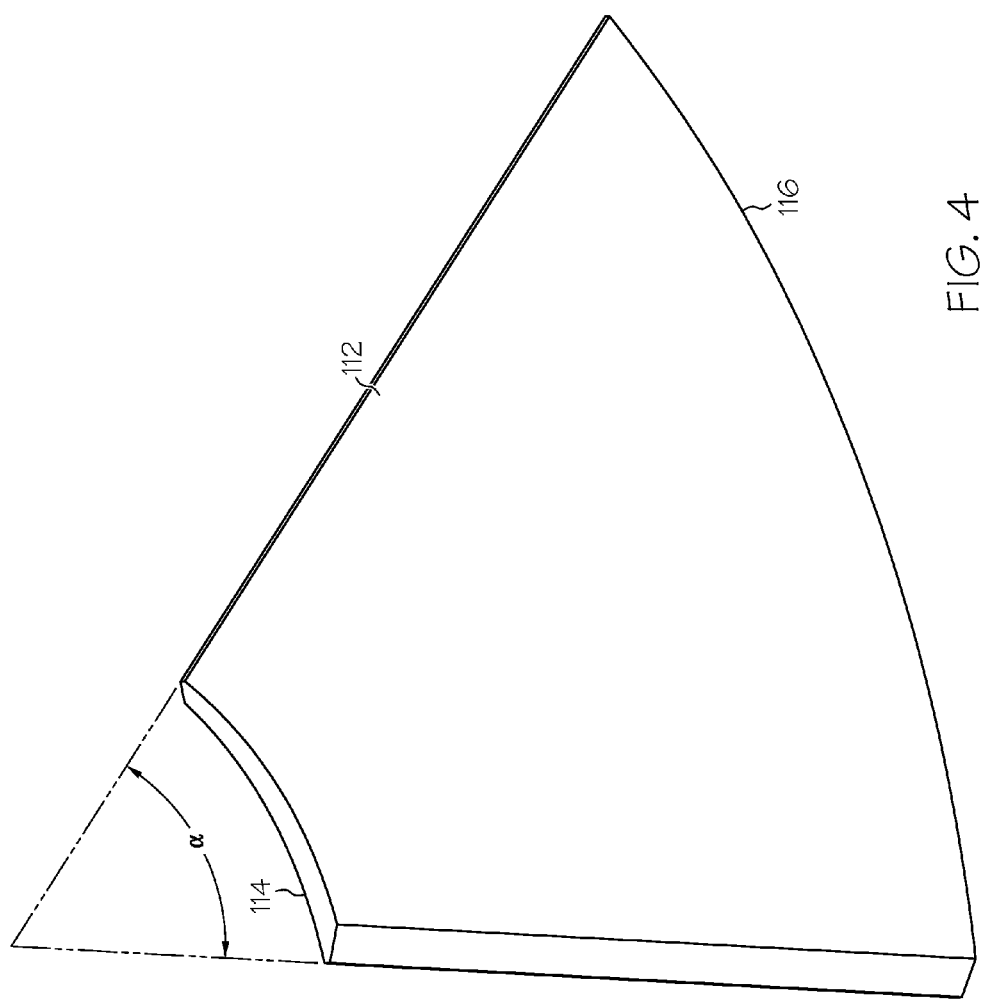
FIG. 4 is a perspective view of a typical lens element of the filter of FIG. 1.

As shown in FIG. 4, each lens 112 may include a substantially flat piece of filter material shaped to have a relatively narrow, arcuate, radially inner end 114 and increase in width radially outward to terminate in a relatively wide, arcuate outer end 116. The width of each lens 112 diverges radially outwardly at an angle α that preferably is inversely proportional to the number of lenses 112 required to extend about the entire periphery of the opening 105 of the searchlight 101. For example, the angle α may be expressed as 360/N where N equals the required number of lenses 112. The lenses 112 may be wider than the minimum required to cover the opening 105 to provide a slight overlap between adjacent lenses 112 when the lenses are in a closed position, or may include, for example, tapered edges that overlap one another when the lenses are in a closed position.

In one aspect, the composition of the lenses 112 may selected to substantially block (by, for example, absorption or reflection) a first band or type of electromagnetic radiation, such as visible light, emitted by the illumination source 102 (see FIG. 2A), while allowing a second band or type of electromagnetic radiation, such as infrared radiation, to pass through. It is within the scope of the invention to fabricate the lenses 112 of material that blocks and allows to pass other bands or types of electromagnetic radiation, and to provide lenses made of materials different from each other, so that the lens 111 may be comprised of lenses made of different materials blocking and allowing to pass different bands or types of electromagnetic radiation.

In one aspect, the lenses 112 may be dichroic or thin-film filters. Such filters have the advantage of reflecting unwanted wavelengths rather than absorbing them, as would be the case with a dyed glass or plastic filter. The substrate selection is dependent on the transmission requirements. In the case of an IR (infrared) filter for night-vision illumination, the primary interest is providing illumination in the NIR spectrum for which PYREX (a trademark of Corning Incorporated, Corning, N.Y.) is more than sufficient. Examples of such materials include NightVision Filter by Optics Balzers, Longwave Pass (LWP) Infrared Coatings by Reynard Corporation and Long Pass Trim Filter by ZC&R Coatings for Optics, Inc.

Figure 5:
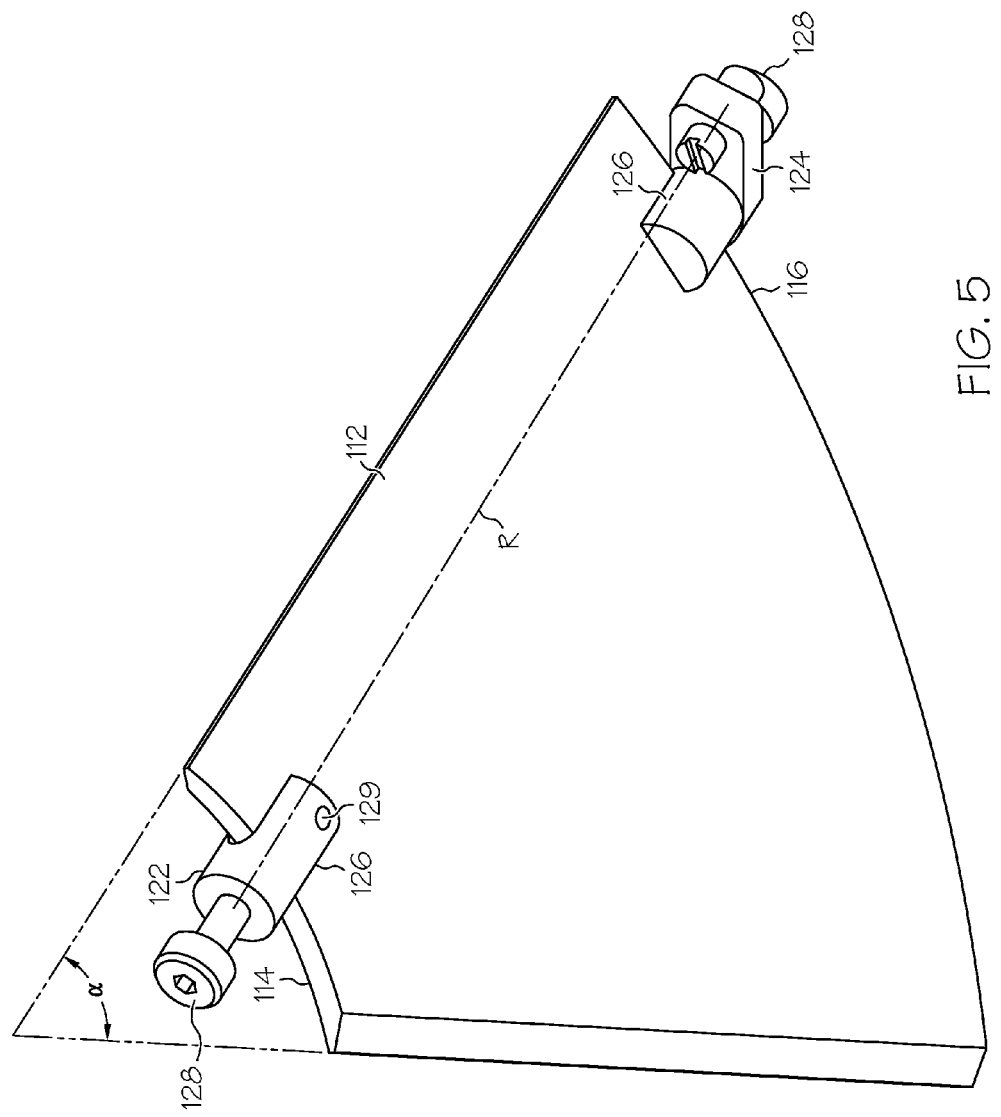
FIG. 5 is a perspective view of the lens segment of FIG. 4 attached to pivots.

As shown in FIG. 5, the filter 100 may include a pivot assembly for pivotally supporting the lenses 112. The pivot assembly may include an inner support 122 attached to each lens 112 at inner end 114, and an outer support 124 attached to the outer end 116. The supports 122, 124 each may include a clamp 126, attached to the lens 112, and a pivot pin 128. Each clamp 126 may be secured to its respective lens 112 by an adhesive, pin, rivet or set screw 129. The pivot pins 128 of the inner and outer supports 122, 124 respectively may define an axis R about which the clamp 126 (and therefore the associated lens 112) may pivot, and therefore the supports 122, 124 may be positioned opposite one another on the lens 112 so that the pins 128 are colinear.

The pivot axis R may extend generally radially from the first end 114 to the second end 116 of the lens 112. In one aspect, this pivot axis R may be offset from one of the edges of the lens 112, or alternatively may be at any position along the lens 112 at an angular offset from the edge. In alternative arrangements, the pivot axis R may be outside the boundaries of the lens 112.

Figure 6A:
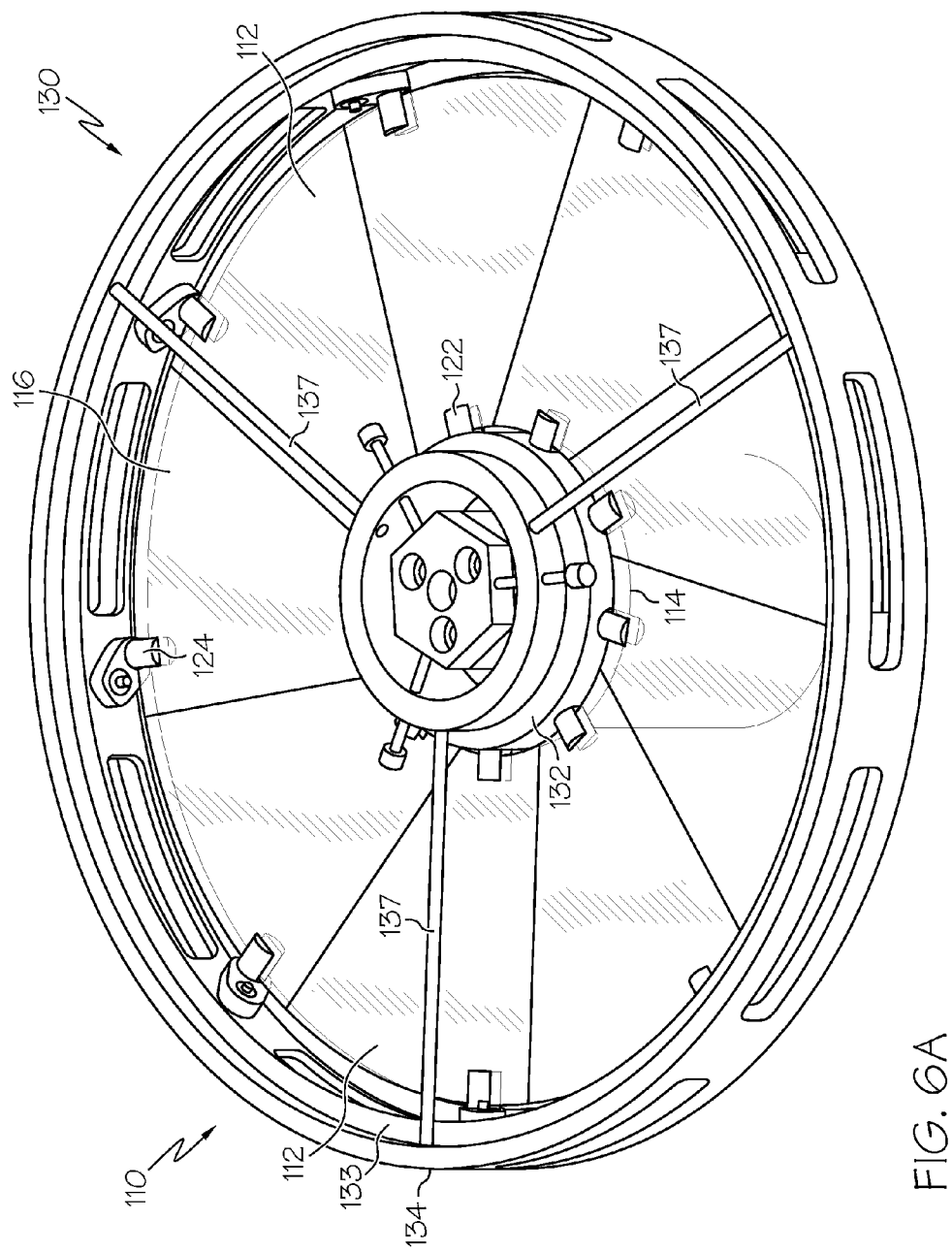
FIG. 6A is a perspective view of the filter of FIG. 2.
Figure 6B:
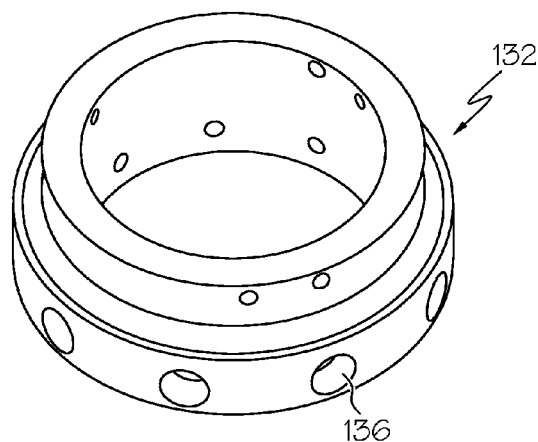
FIG. 6B is a perspective view of a central lamp shield of the filter of FIG. 5A.

As shown in FIG. 6A, the lenses 112 may be mounted on support structure, generally designated 130. The support structure 130 may include an inner support in the form of a central lamp shield 132 (see also FIGS. 2 and 6B), an inner peripheral support ring 133 and an outer peripheral support ring 134. As shown in FIG. 6B, the central lamp shield 132 may include a plurality of openings 136 (FIG. 6B) for receiving the pivot pins 128 (FIG. 5) of the inside supports 122 to support the inner ends 114 of the lenses 112, while allowing the inside support 122 to pivot about the pin 128.

The outer support ring 134 is fixed relative to the central lamp shield 132 and is connected thereto by a spider in the form of radially extending struts 137. The outer support ring 134 includes openings 138 shaped and positioned to receive the pivot pins 128 (see FIG. 5) of the outer supports 124 of the lenses 112.

Figure 6C:
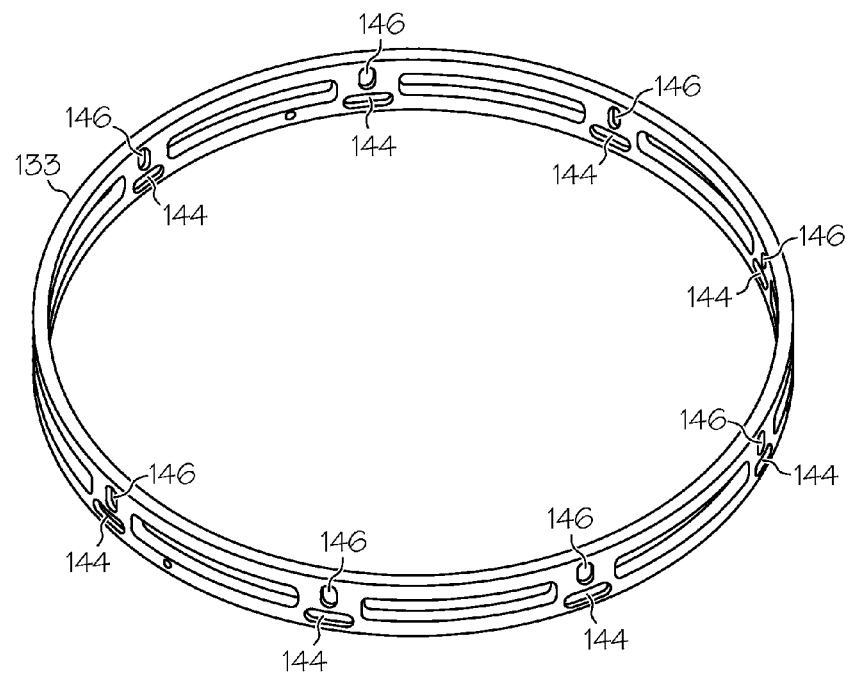
FIG. 6C is a perspective view of an inner peripheral rim of the filter of FIG. 5A.
Figure 7A:
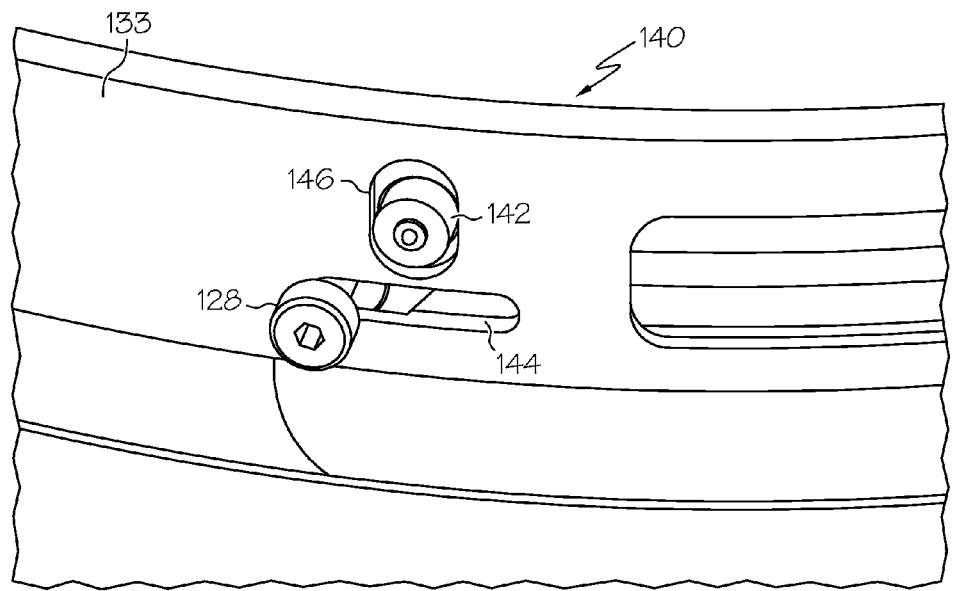
FIG. 7A is detail in perspective of a typical lens element outer pivot attachment, viewed from outside the searchlight.
Figure 7B:
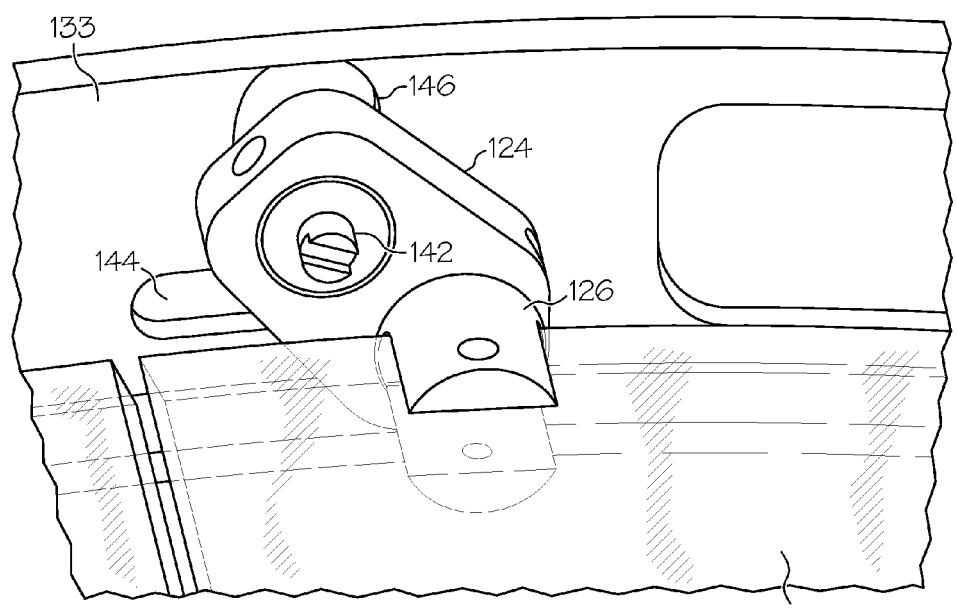
FIG. 7B is a detail in perspective of the pivot attachment of FIG. 7A, viewed from inside the searchlight.
Figure 8:
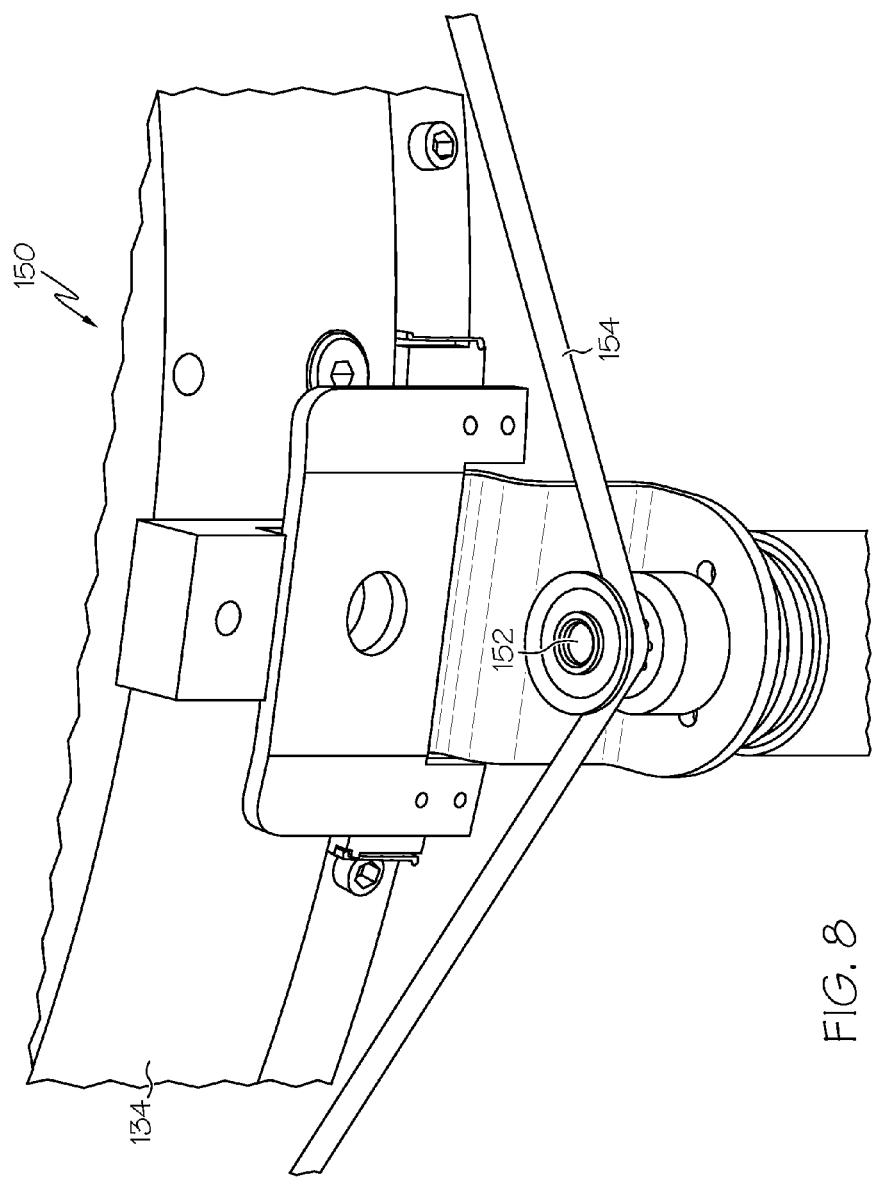
FIG. 8 is a detail in perspective of the actuator assembly shown in FIG. 2.

As shown in FIG. 6C, the inner support ring 133 may include pairs of horizontal and vertical slots 144, 146, respectively, corresponding in number to the number of lenses 112 of the filter 100. The horizontal slots 144 receive the pivot pins 128 of the outer supports 124 and, as shown in FIGS. 7A and 7B, the vertical slots 146 receive locking pins 142. The slots 144, 146 may act as cam surfaces against which the pins 128, 142 may slide.

Figure 6D:
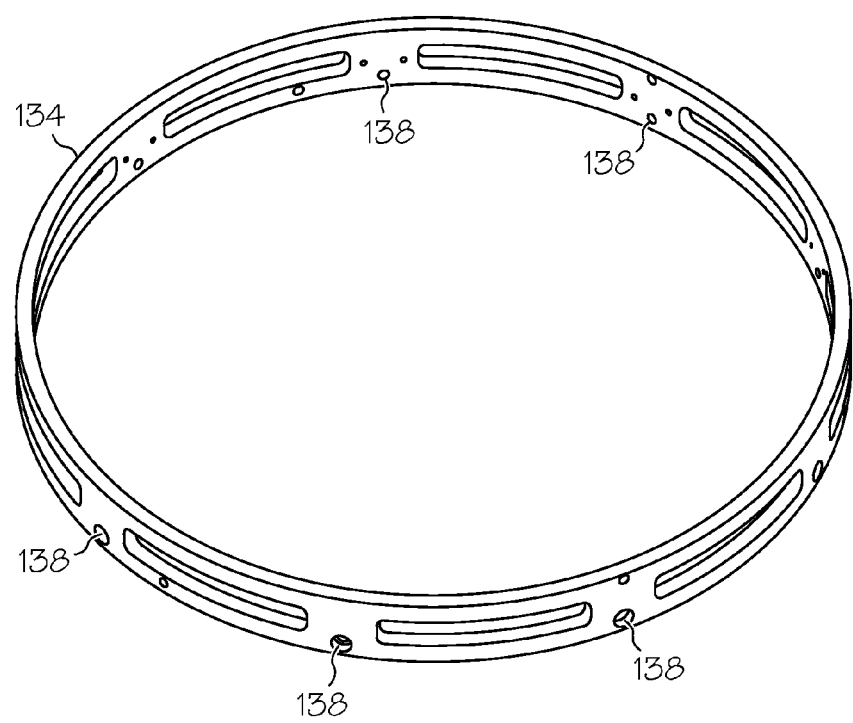
FIG. 6D is a perspective view of the outer peripheral rim of the filter of FIG. 5A.

The pivot pins 128 of the outer support 124 also may be supported by openings 138 (shown in FIG. 6D) in the outer ring 134. These openings 138 may allow the pivot pins 128 to rotate, but hold the position of the pivot pins fixed relative to the outer ring 134, and hence the filter 100. The terms "horizontal" and "vertical" are used here for ease of identification. It is to be understood that the searchlight 101 may be positioned in a number of orientations where the angle of these slots relative to the horizon may change. Further, the slots 144, 146 may not be perfectly linear and may include a radius.

As shown in FIG. 6A, the inner support ring 133 may be surrounded and concentric with the outer support ring 134, and may be rotatable relative to the outer support ring. As the inner support ring 133 is rotated relative to the outer support ring 134, the openings 138 (FIG. 6D), which receive the pivot pins 128, hold the pivot pins fixed relative to the filter 100, thus causing the horizontal cam slots 144 of the inner support ring to move along the pivot pins 128 (shown in FIG. 7A) as the inner support ring rotates. Because the locking pins 142 are constrained within their respective vertical cam slots 146, rotation of the inner support ring 133 will rotate the lenses 112 in unison about their respective pivot pins 128 rather than translate along the slots 144. As the horizontal slots 144 of the inner support ring 133 move relative to the pivot pins 128, the distance between the pivot pins 128 and locking pins 142 will remain constant. The locking pins 142 will thus travel along the vertical slots 146 as each lens element 112 is rotated about its axis R.

According to one aspect, the filter 100 may include a locking element to secure the lenses 112 in either an open (non-filtering) or closed (filtering) configuration so that the lenses remain in that position until again activated to shift to the other position. For example, a spring-actuated detent (not shown) may be included that resists rotation of the lenses 112.

As shown in FIGS. 2, 8, 9A and 9B, the filter 100 may include an actuator, generally designated 150, to rotate the inner support ring 113. The actuator 150 may include a motor 152 with a drive pulley that engages a friction belt 154 that extends about the periphery of the outer support ring 134. The motor 152 may be a stepper motor and/or may include limit switches (not shown) to limit the rotation of the outer support ring 134 between a closed position, shown in FIG. 9A, in which the lenses 112 are each pivoted to close the opening in the searchlight, and an open position, shown in FIG. 9B.

Figure 9A:
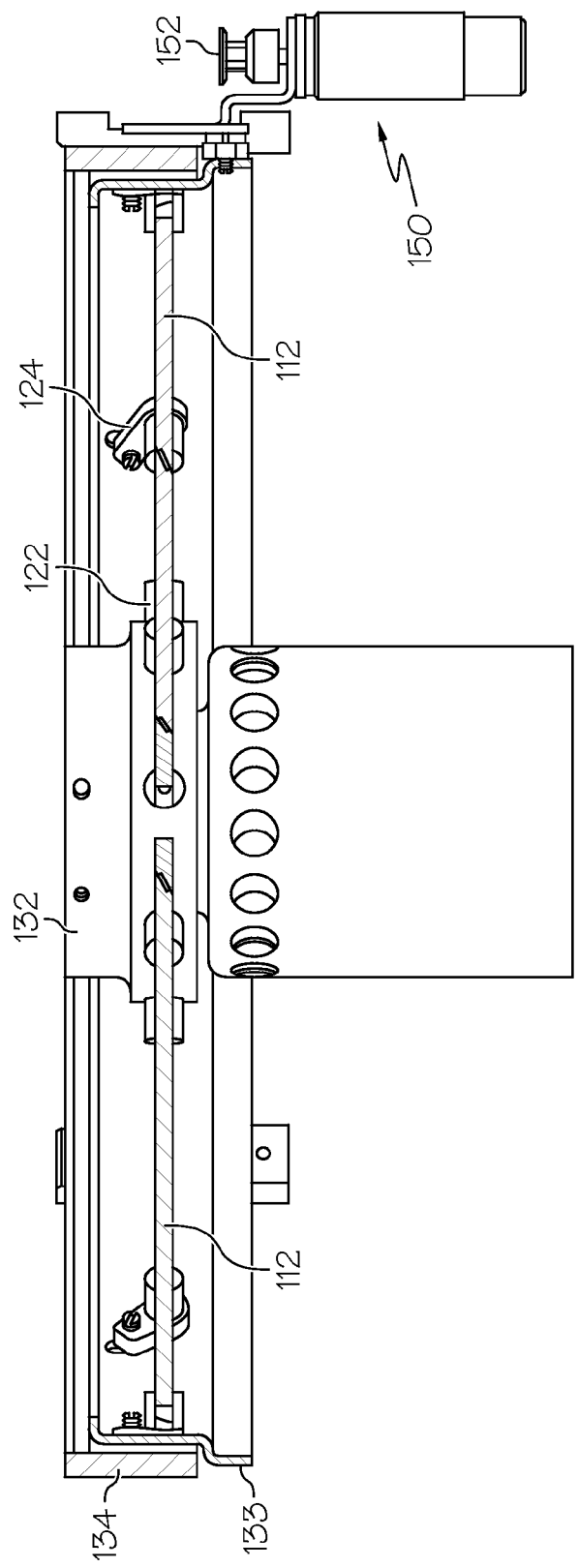
FIG. 9A is a side elevation in section of the filter of FIG. 2, shown in a closed position.
Figure 9B:
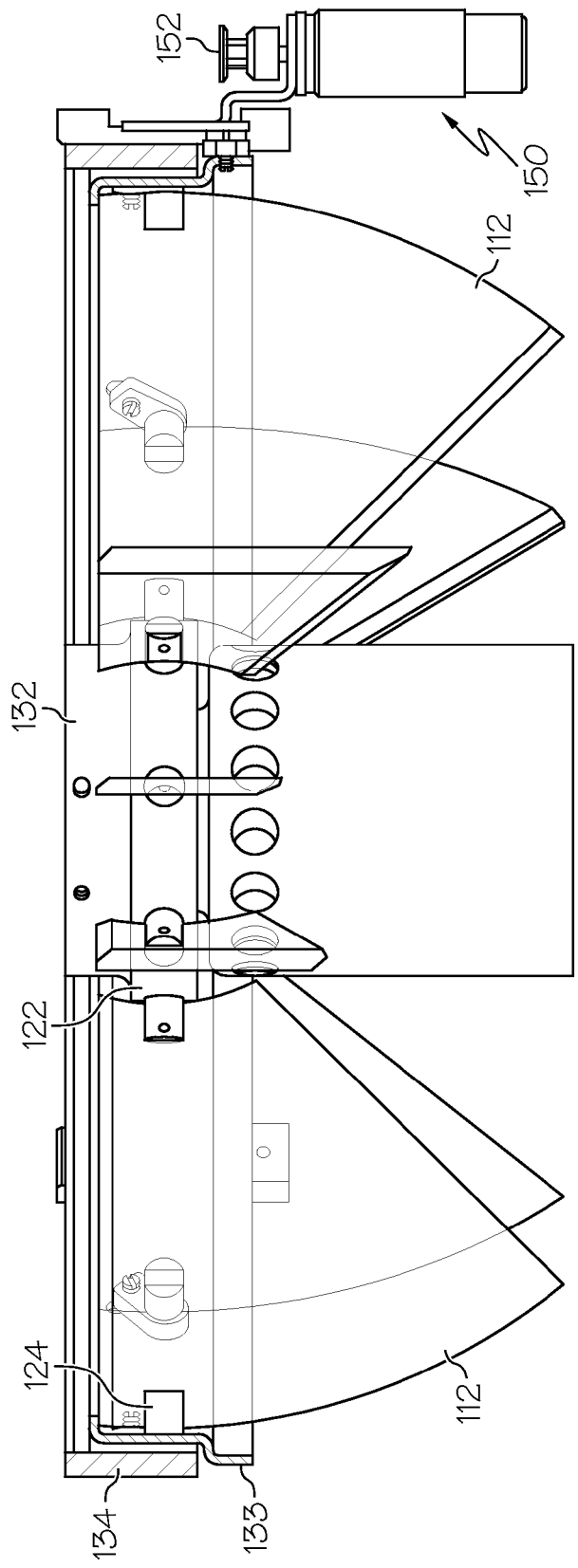
FIG. 9B is a side elevation in section of the filter of FIG. 2, shown in an open position.

As shown in FIG. 9A, when pivoted to the closed position, the lenses 112 lie substantially in a plane that is perpendicular to a beam of electromagnetic radiation reflected through the filter 100 by reflector 104. As shown in FIG. 9B, when pivoted to the open position, the lenses 112 are each pivoted to lie in a plane that is substantially parallel to the beam of electromagnetic radiation reflected through the filter 100 by reflector 104, which planes are perpendicular to the searchlight opening 105 (see also FIG. 3C).

Figure 10A:
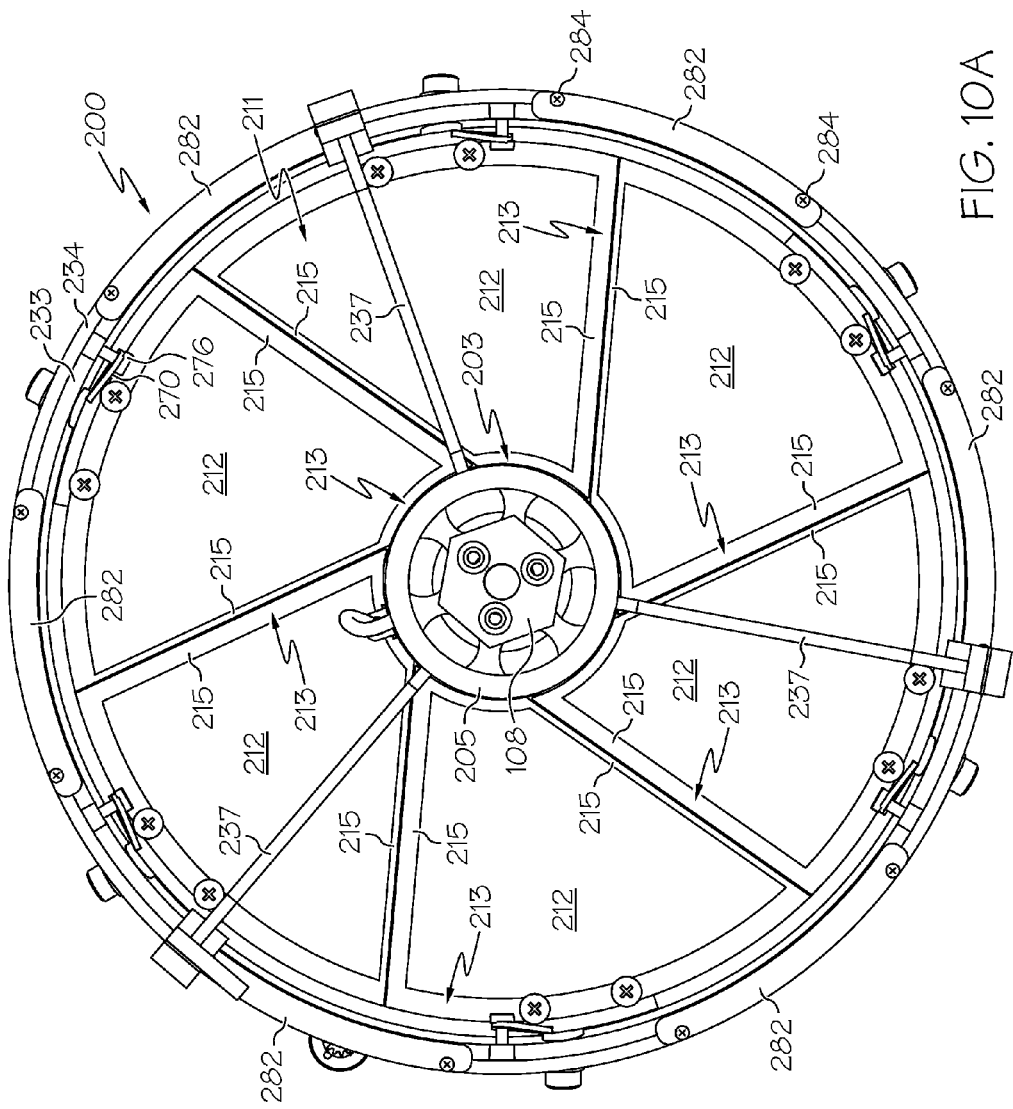
FIG. 10A is a top view of another embodiment of the disclosed filter, showing the filter in the closed position.
Figure 10B:
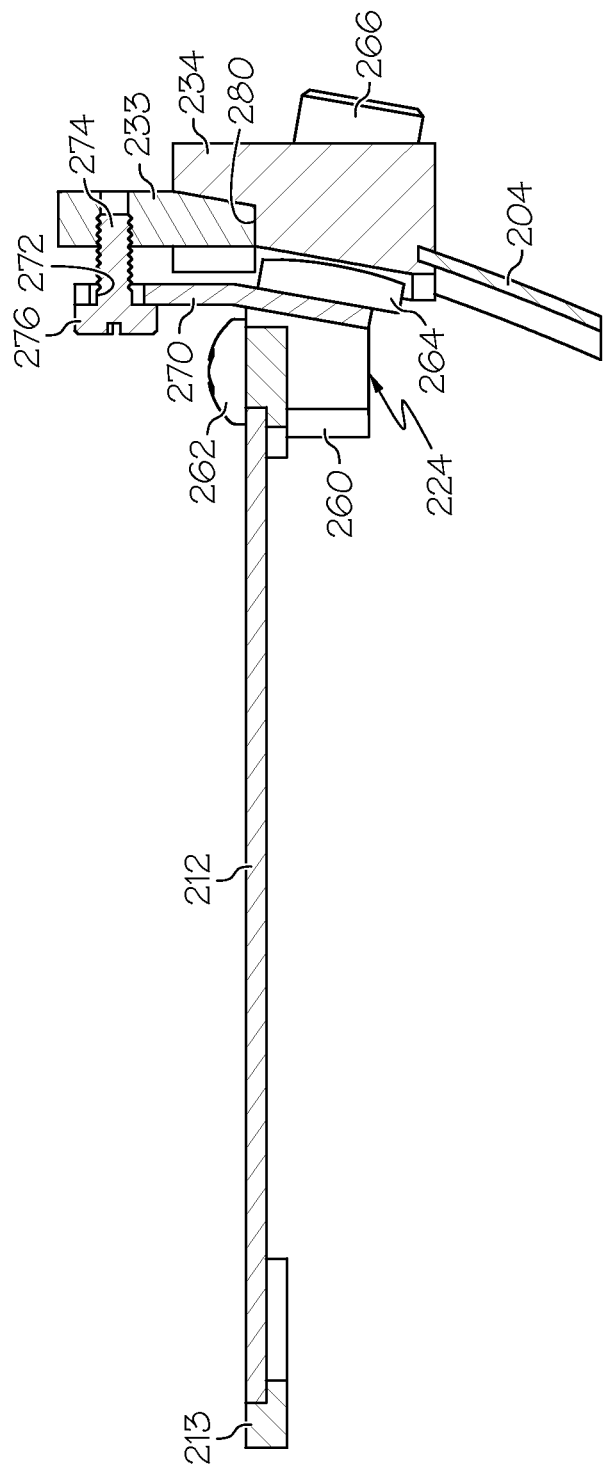
FIG. 10B is a section taken at line A-A of FIG. 10A.
Figure 10C:
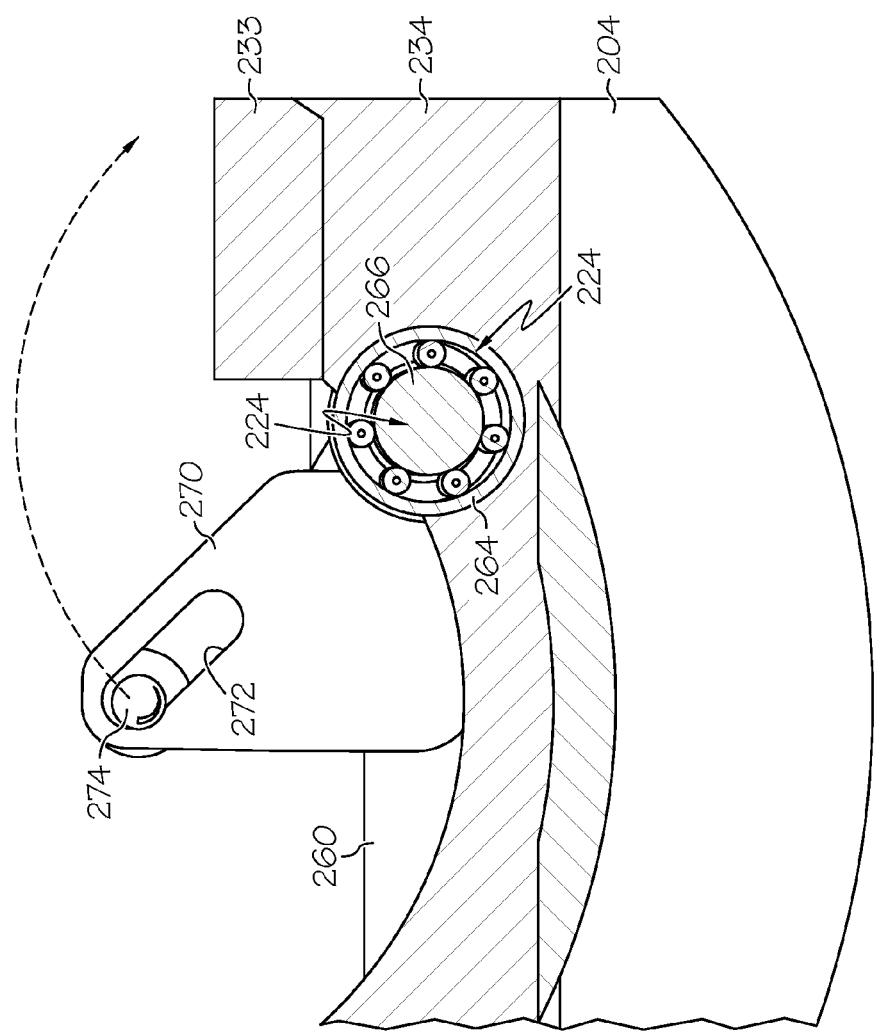
FIG. 10C is a section taken at line B-B of FIG. 10A.
Figure 10D:
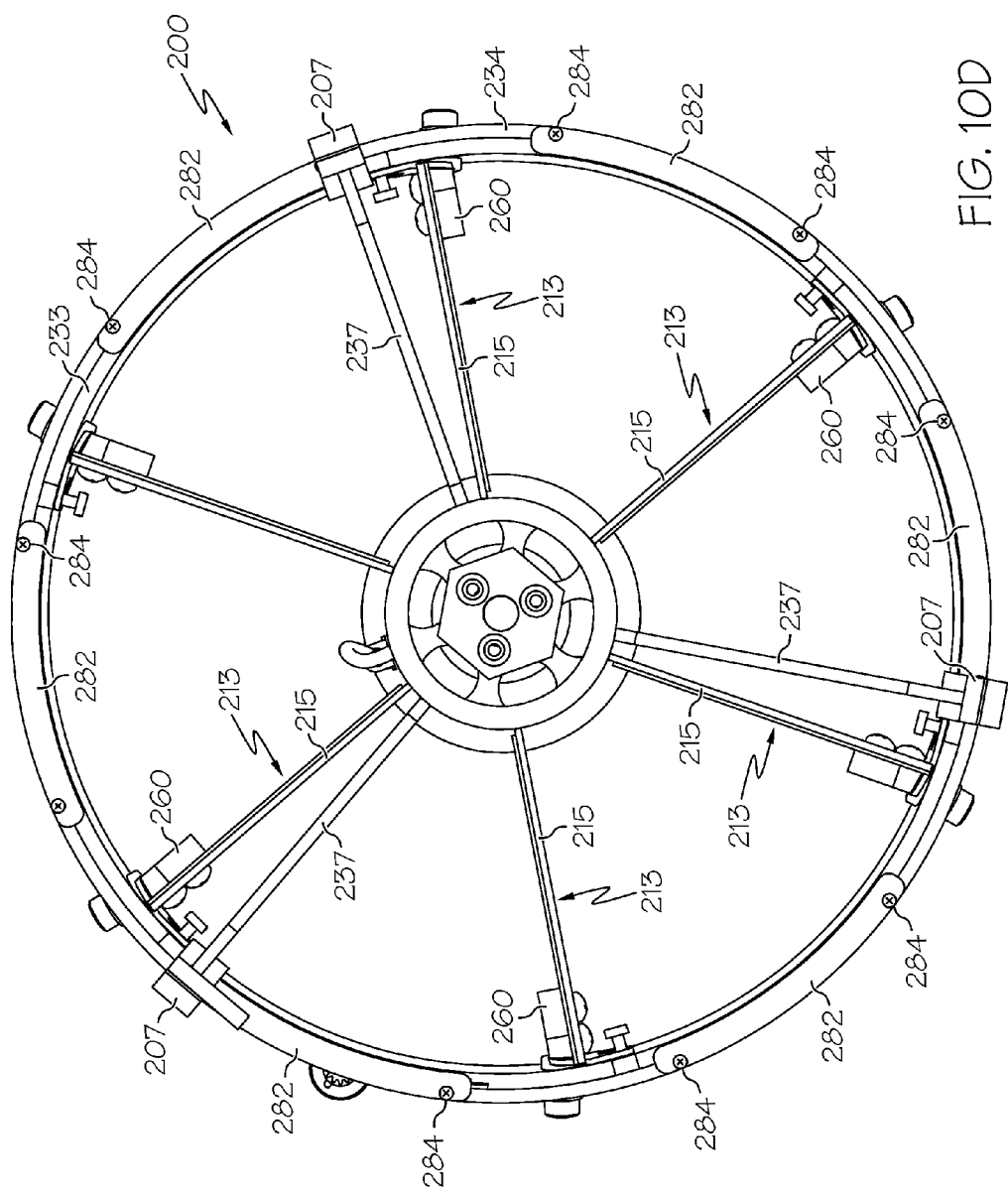
FIG. 10D is a top view of the embodiment of FIG. 10A in which the lens has been pivoted to an open position.
Figure 10E:
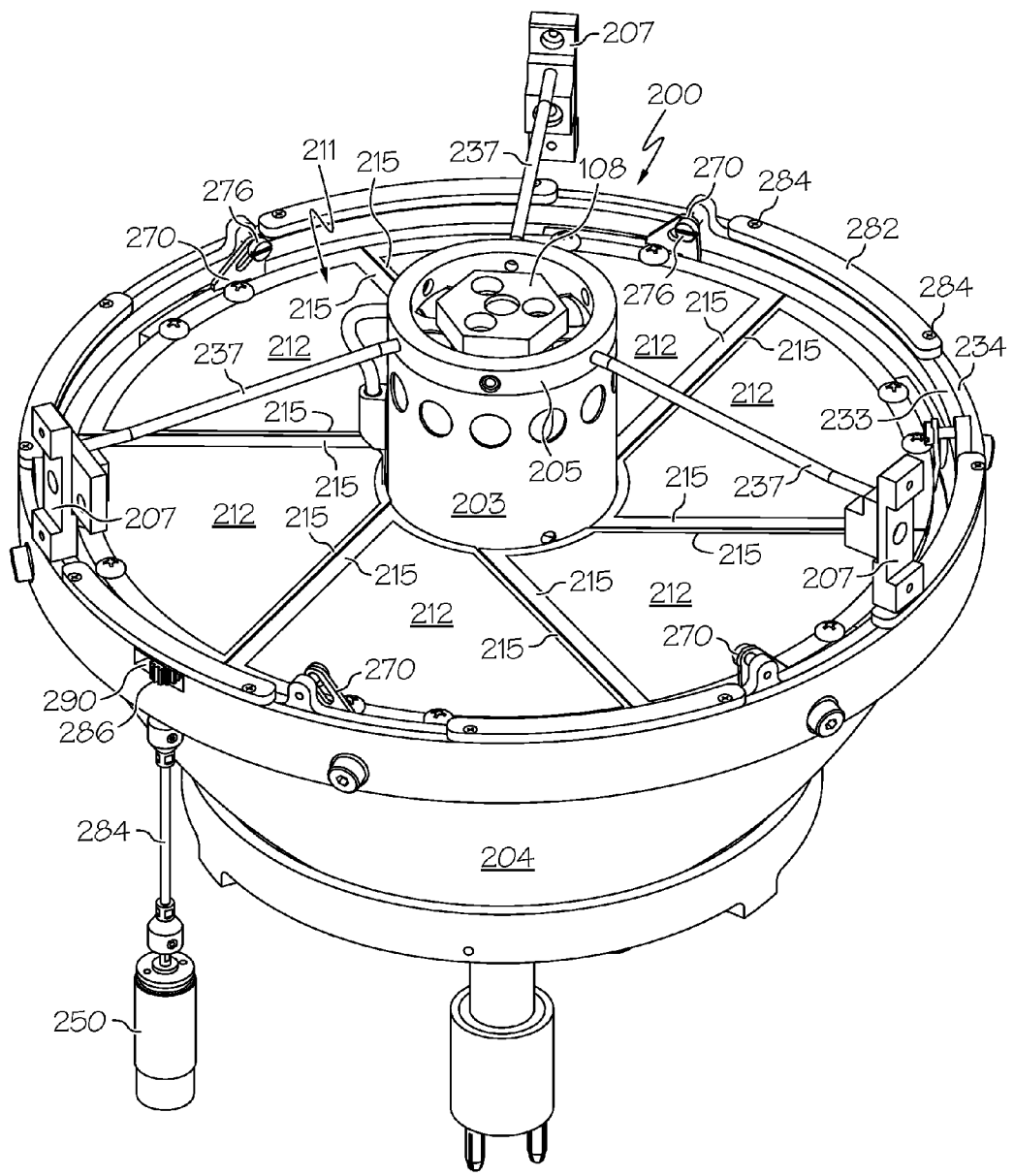
FIG. 10E is a perspective view of the embodiment of FIG. 10A, shown mounted on a searchlight.

FIGS. 10A-L show another embodiment of the filter, generally designated 200, having a composite lens 211 made up of lenses 212, each including a frame 213 extending about its periphery. As shown in FIGS. 10A and 10E, the lenses 212 and frames 213 may be shaped to overlap when in the closed position. Unlike the lenses 112 shown in FIG. 2A, for example, the lenses 212 may be asymmetric in shape and include side walls 215 that extend at oblique angles to the center of the filter 200 and baffle 203.

With this embodiment, as best shown in FIGS. 10A, 10D and 10E, the baffle 203 extends above the plane of the filter 200 and may include a ring 205 that receives the inner ends of support struts 237. The outer ends of struts 237 may be attached to mounting brackets 207 that in turn may be attached to the housing 106 (see FIG. 2A). The struts 237 keep the baffle 203, and the cathode 108, which is attached to and centered within the ring 205, centered relative to the reflector 204.

The frames 213 are mounted on inner and outer support rings 233, 234, respectively and are unsupported at their radially inner ends adjacent the baffle 203. The radially inner ends of the frames 213 may be shaped to conform to the contour of the adjacent wall of the baffle 203. Thus, the frames 213 are cantilevered inwardly from inner and outer support rings 233, 234, respectively. The side walls of the frames 213 may include slots 214 (see FIGS. 10G and 10L) that are spaced slightly inward from the frame edges, forming ribs 216. When pivoted to the closed position, as shown in FIGS. 10A and 10E, the lenses 212 are shaped and positioned such that the ribs 216 of a lens frame 213 may be received within the slots 214 of the adjacent lenses. This interlock prevents emitted light from "leaking" through the composite lens 211 when in the closed position.

Figure 10F:
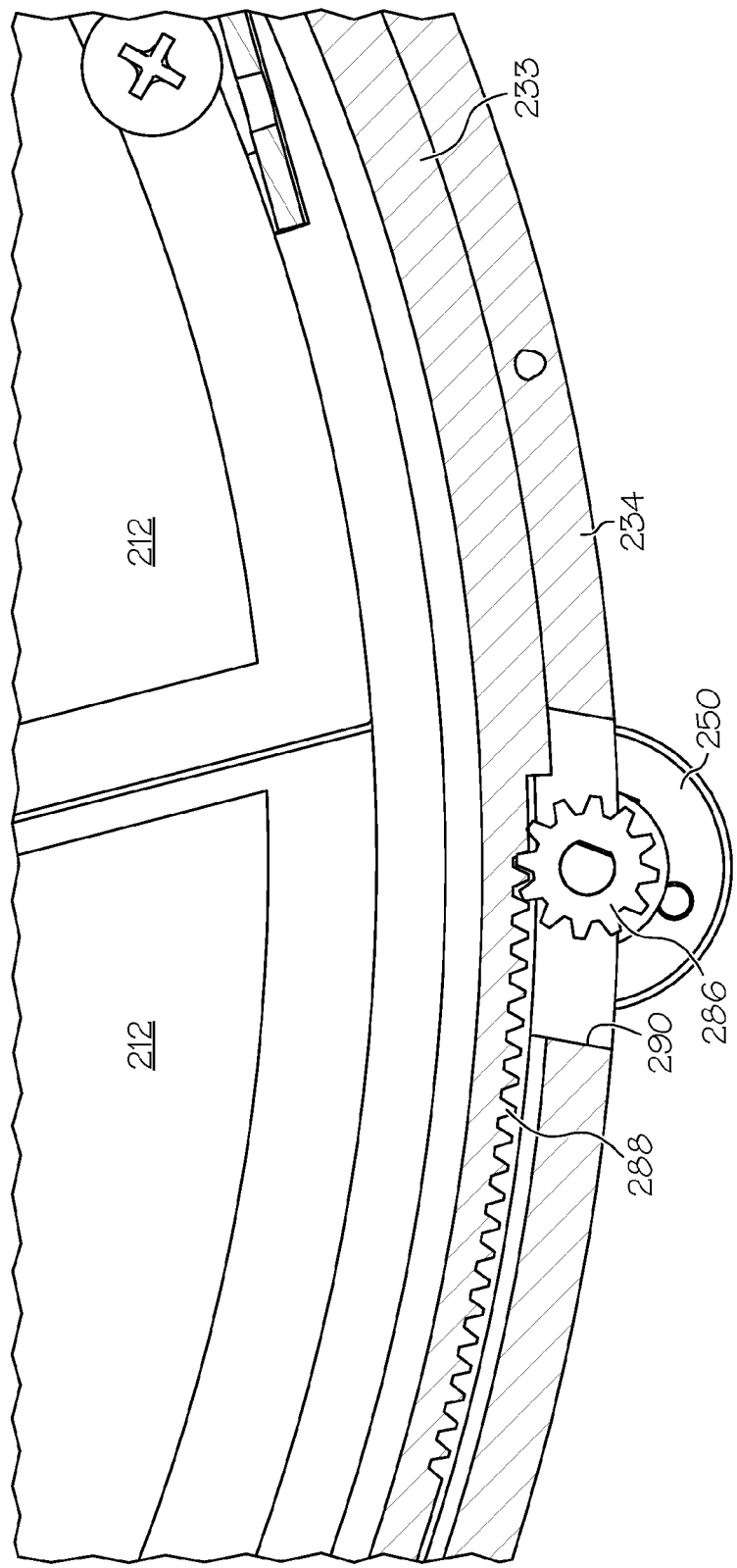
FIG. 10F is a detail of the embodiment of FIG. 10A showing the actuator motor.
Figure 10G:
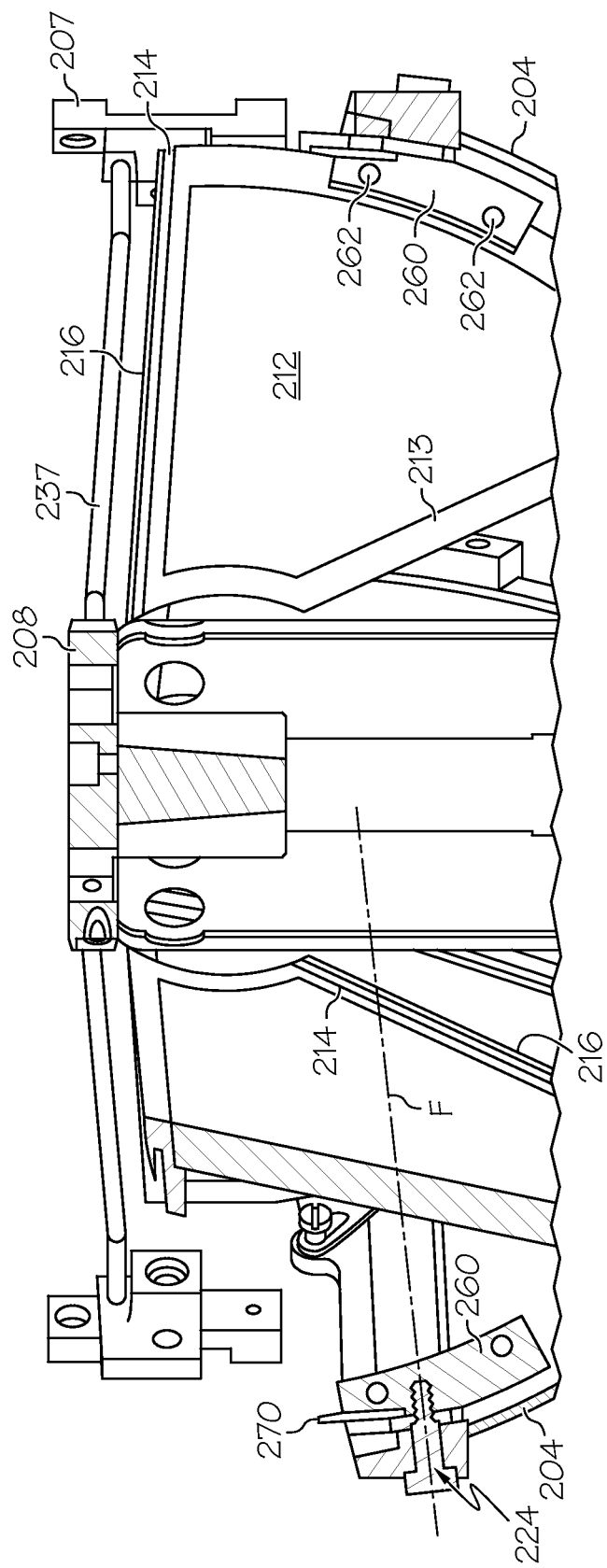
FIG. 10G is a detail elevational view of the embodiment of 10A, partially in section, and in which the filter is in the open position.
Figure 10H:
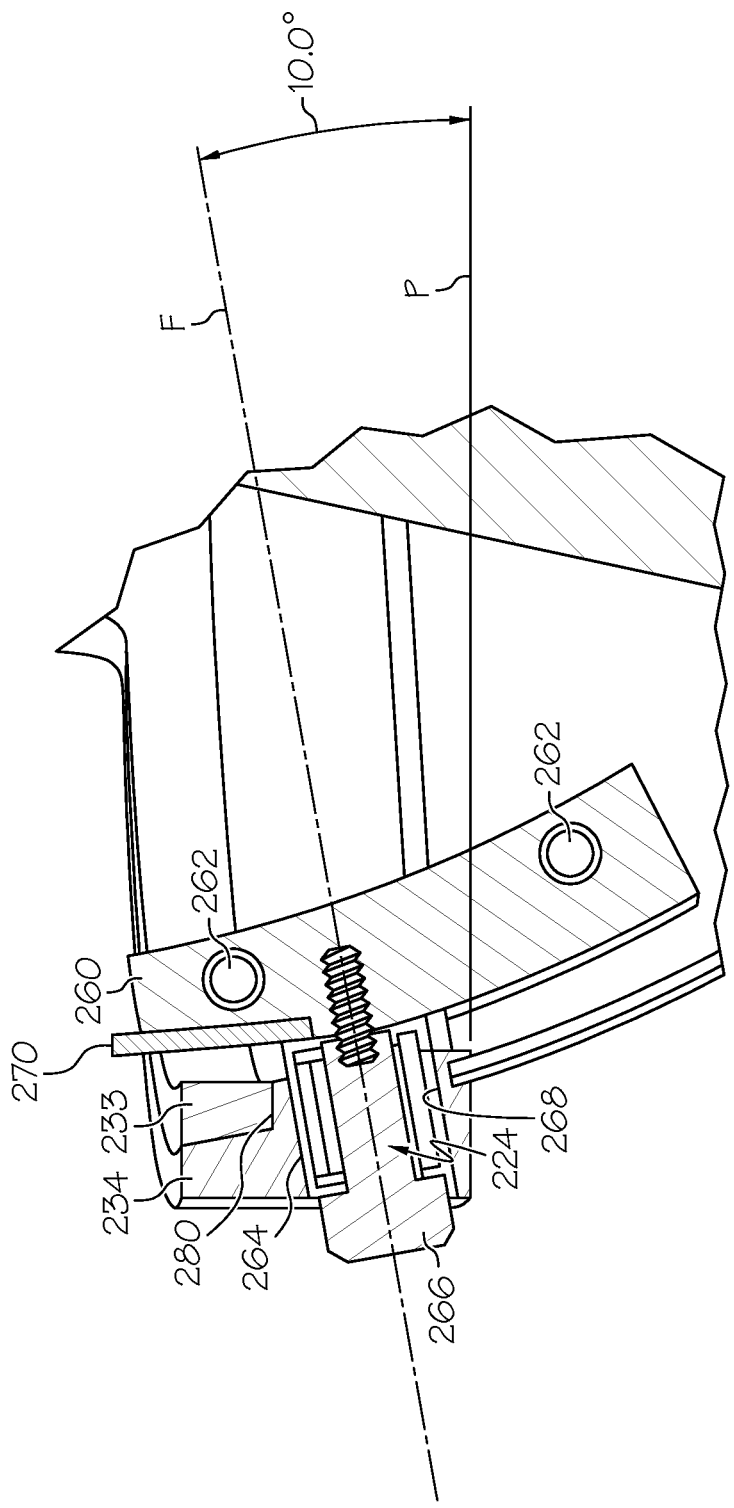
FIG. 10H is a detail of the pivot assembly of the embodiment of FIG. 10A.
Figure 101:
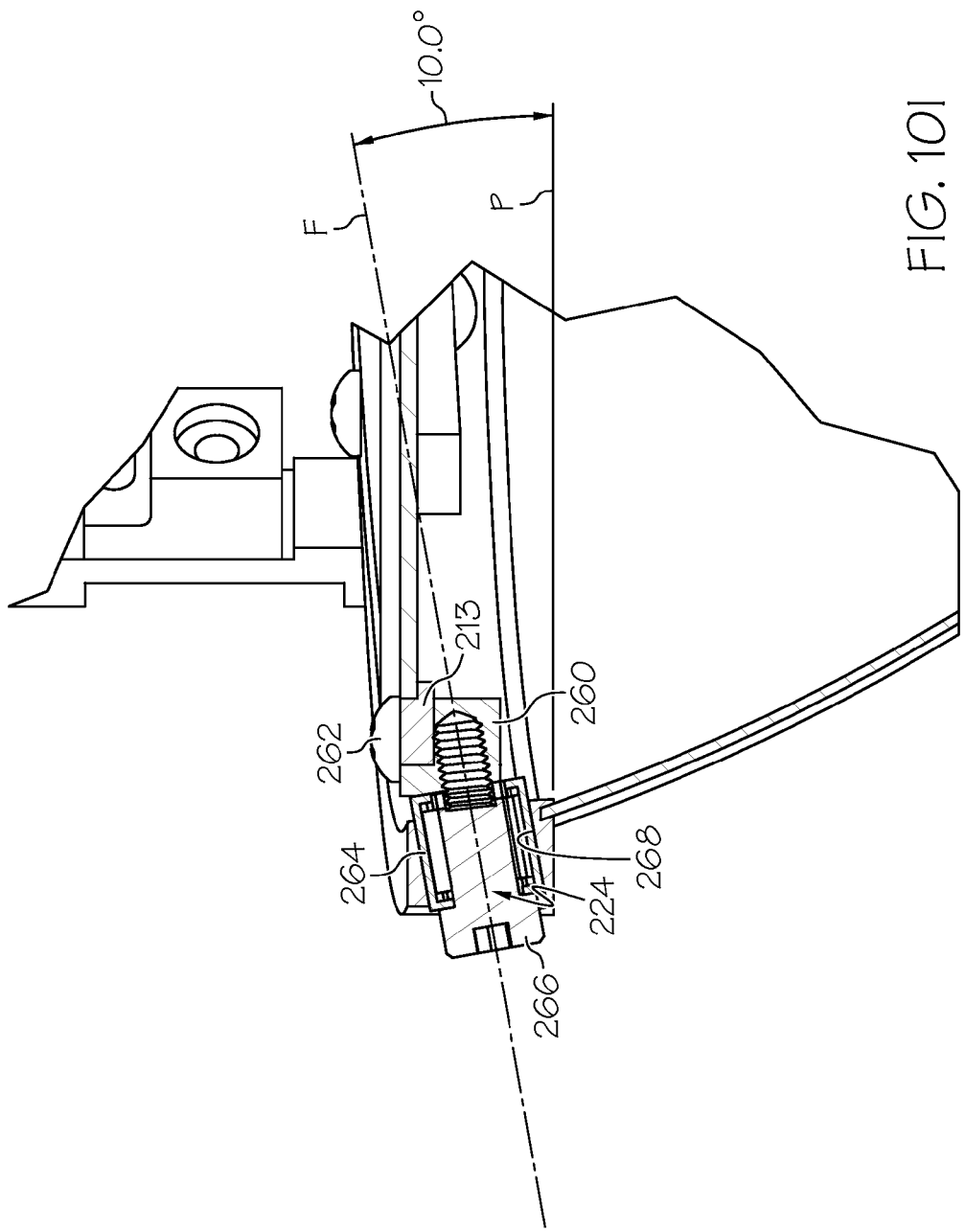

The frames 213 may be attached to the support rings 233, 234 by pivots, generally designated 224, best shown in FIGS. 10B, 10C, 10G, 10H and 10I. Each pivot 224 may include a flange 260 attached to an associated lens frame 213 by means such as screws 262. The flange 260 may be attached to a bearing 264 by a mounting screw 266. The bearing 266 may be pressed into a hole 268 formed in the outer ring 234, as best shown in FIGS. 10C, 10H and 10I. The hole 268 in the outer ring 234 may be angled upwardly from the plane P of the composite lens 211 in the closed position (see FIGS. 10A and 10E) so that each lens 212 will pivot about an axis F (see FIGS. 10H and 10I) that is inclined to the plane P.

Similarly, the holes 268 are oriented such that the pivot axes F may be angled obliquely (i.e., offset) relative to a radius R as shown in FIG. 10K. In one aspect, the pivot axes F may be angled 10° relative to the plane P and 10° to the radius R. In one aspect the inclination angle and oblique angle made by pivot axes F may be approximately equal to each other. This will ensure that when pivoted to an open position as shown in FIG. 10K, the lenses 212 will be oriented substantially vertically (i.e., substantially perpendicular to the plane P), and each lens will be oriented substantially along a radius R relative to the inner and outer support rings 233, 234. This may provide the advantage of orienting the lenses 212 when in the open position such that they obstruct a minimal amount of light (or other electromagnetic radiation) emitted by the associated searchlight 101 (see FIG. 1). Another advantage of offsetting the pivot axes F in the aforementioned manner is that it provides clearance between the frames 213 of the lenses 212 and the inner surface of the reflector 204 when the lenses are pivoted to the open position, as shown in FIG. 10G.

Figure 10J:
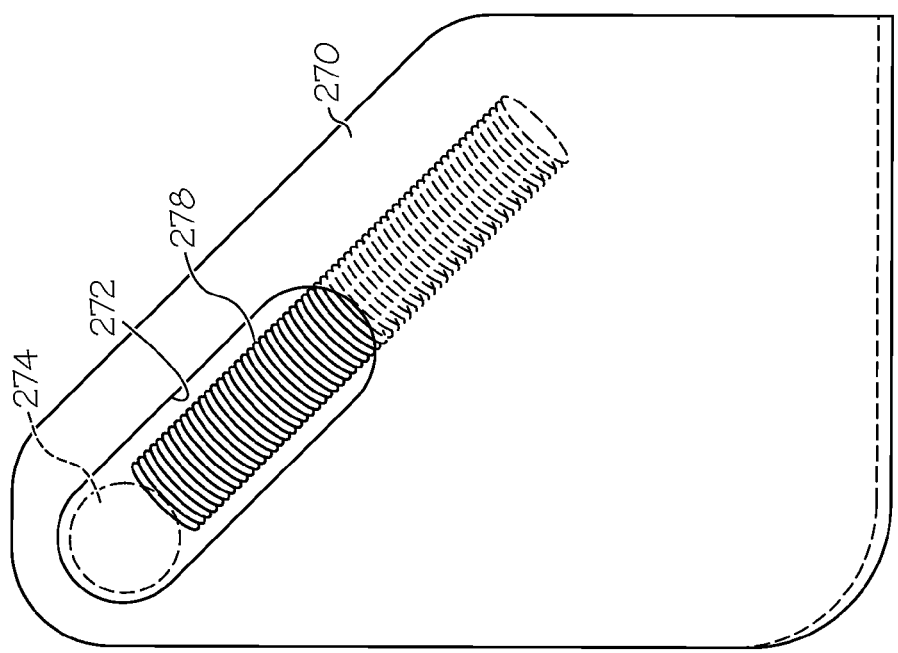
FIG. 10J is a detail of a crank arm of the embodiment of FIG. 10A.

As shown in FIGS. 10B, 1010E, 10J and 10L, Each pivot 224 may include a crank arm 270 that may be attached to and extend from the flange 260. The crank arm 270 may include an elongate slot 272 shaped to receive the shank 274 of an actuation pin 276 that is threaded into inner support ring 233. As shown in FIG. 10J, each crank arm 270 may include a compression spring 278 that is attached to the crank arm at a lower end (as shown in the FIG. 10J) by means such as a pin or projection (not shown), and whose upper end urges against the shank 274 of the actuation pin 276 (FIG. 10B). The force exerted by the spring 278 will ensure that the lenses 212 are held fully closed (FIG. 10B) or fully open (FIG. 10L).

As shown in FIGS. 10A, 10D, 10E and 10H, the inner support ring 233 is concentric with, and is shaped to rest upon, an annular ledge 280 of outer support ring 234 (see FIGS. 10B and 10H). The outer support ring 234 is mounted on and is fixed relative to the reflector dish 204. The inner ring 233 may be retained in engagement with ledge 280 by retaining plates 282 that may be attached to the outer support ring 234 by screws 284. Thus, the inner support ring 233 is captured by the retaining plates 282 and is capable only of rotational motion relative to outer retaining ring 234.

As shown in FIGS. 10E and 10F, the filter 200 may include an actuator motor 250 having an output shaft 284 connected to a spur gear 286. The spur gear 286 may mesh with a rack 288 formed in the outer periphery of the inner support ring 233. The output shaft 284 may extend through an opening (not shown) formed in the outer support ring 234, and the spur gear 286 may be received in a cutout 290 formed in the outer support ring. The actuation motor 250 may be mounted on the reflector 204 (not shown), as is the outer support ring 234 (see FIGS. 10H and 10I, for example), or may be mounted on the housing 106 (see FIG. 2A), or any component of the searchlight 100 that is fixed relative to the outer support ring. Rotation of the spur gear 286 by actuation motor 250 will cause the inner support ring to rotate clockwise or counterclockwise relative to outer support ring 234. The travel of the inner support ring 233 relative to the outer support ring 234 may be controlled by limit switches (not shown), or a controller (not shown).

The operation of the filter 200 is as follows, As shown in FIGS. 10A, 10B and 10C, when the filter 200 is in the closed position, the lenses 212 are substantially planar, lying in the plane P, and the frames 213 thereof may lie in an overlapping relation. The flanges 260 may be generally co-planar with the lenses 212 and the crank arms 270 of the pivots 224 may be oriented as shown in FIGS. 10B and 10C. In this configuration, the lenses 212 substantially cover the exit opening of the reflector 204 so that substantially all emitted radiation from the associated searchlight 101 passes through the lenses.

To adjust the filter 200 to an open position, the actuator motor 250 is actuated to rotate spur gear 286 (FIG. 10F) to rotate inner support ring 233 counterclockwise, as shown in FIGS. 10A and 10E. This relative rotation causes the shank 274 of the actuation pin 276 to move relative to the outer support ring 234 and rotate the crank arm 270, mounting screw 266 and inner race of the bearing 264 clockwise in the direction of the dotted arrow in FIG. 10C about the outer race of the bearing. This rotation of the crank arm 270 causes the flange 260 to which it is attached to rotate, thus rotating the lens 212 attached to the flange. Rotation of the lenses 212 along their respective axes F in this manner stops when the rotation of the inner support ring 233 has reached its maximum travel. At that point, as shown in FIG. 10L, each crank arm 270 of the filter 200 has pivoted clockwise to the point where the lens 212 attached to it is oriented substantially vertically, as shown in FIGS. 10K and 10L, which is perpendicular to plane P of FIG. 10I. Because of the inclination of the pivot axes F relative to the plane P, the radially outer walls of the frames 213 are angled away from the inner wall of the reflector 204, as shown in FIG. 10G. During the pivoting movement of the crank arm 270, the shank 274 travels within the slot 272 since the crank arm 270 travels in an arcuate path, whereas the shank 274 of the actuation pin 276 travels in a substantially linear motion in a plane parallel to the plane P.

To pivot the lenses 212 from the open position, shown in FIGS. 10D and 10K, to the open position shown in FIG. 10A, the process is reversed. The actuator motor 250 is actuated to rotate the spur gear 286 in the opposite direction, thereby rotating the inner support ring 233 clockwise, as viewed in FIG. 10D. The rotation of the inner support ring 233 causes the crank arm 270 to pivot the flange 260, and the attached lens 212, about the pivot axis F for each lens 212 of the composite lens 211. Pivoting movement of the lenses 212 may stop when the lenses are oriented substantially perpendicular to plane P, which may be parallel to the radiation emitted from the searchlight 101.

Other actuating assemblies for effecting relative rotation of the outer support ring 134 may be employed without departing from the scope of the invention. For example, the actuator motor drive pulley may be replaced with a spur gear that engages and drives a ring gear fitted about the outer periphery of the outer support ring 134.

While the methods and forms of apparatus disclosed herein may constitute preferred aspects of the disclosed filter, it is to be understood that the invention is not limited to these precise forms and methods, and that changes may be made therein without departing from the scope of the invention.

What is claimed is:

1. A filter comprising:
   a plurality of lenses, each of the plurality of lenses configured to pivot about an associated pivot axis of a plurality of radially extending, substantially coplanar pivot axes extending from a common origin;
   a central lamp shield adapted to engage an electrode of an illumination source and supporting inner ends of each of the plurality of lenses, whereby the filter is centered relative to the electrode of the illumination source;
   an outer support having an inner peripheral support ring and an outer peripheral support ring, the outer peripheral support ring fixed relative to the central lamp shield and receiving outer ends of each of the plurality of lenses for pivoting about the pivot axes, and the inner peripheral support ring connected to the outer ends of each of the plurality of lenses so that rotation of the inner peripheral support ring relative to the outer peripheral support ring causes the lenses to pivot about the pivot axes;
   wherein, when pivoted to a closed position, the lenses pivot about the pivot axes to form a substantially planar ring-shaped composite lens substantially orthogonal to a direction of emittance of radiation from the illumination source;
   and wherein, when pivoted to an opened position, the lenses pivot about the pivot axes to be substantially co-planar with the direction of emittance of radiation from the illumination source;
   the lenses each having a relatively narrow, arcuate radially inner end and increasing in width radially outward to terminate in a relatively wide, arcuate outer end, and each of the pivot axes extends from the radially inner end to the outer end of a respective one of the lenses at a location offset from a center of the lens.

2. The filter of claim 1, wherein said lenses substantially block visible electromagnetic radiation.

3. The filter of claim 2, wherein the plurality of axes is substantially evenly distributed about 360 degrees.

4. The filter of claim 1, wherein the pivot axes are oriented such that when the lenses are pivoted to the opened position, a major portion of each of the lenses extends from the pivot axis toward the radiation source.

5. The filter of claim 4, wherein each of the pivot axes is outside the boundaries of an associated lens of the plurality of lenses.

6. The filter of claim 1, wherein each of the lenses is configured as a planar ring segment.

7. The filter of claim 1, wherein the outer support is configured for attaching to the source of illumination.

8. The filter of claim 1, wherein the lenses each include an outer support engaging the inner peripheral support ring and the outer peripheral support ring.

9. The filter of claim 8, wherein the outer supports each include a pivot pin and a locking pin.

10. The filter of claim 9, wherein the inner peripheral support ring includes pairs of horizontal and vertical slots corresponding to each of the outer supports, the vertical slots receiving the locking pins and the horizontal slots receiving the pivot pins.

11. The filter of claim 9, wherein the outer peripheral support ring includes a plurality of openings receiving the pivot pins.

* * * * *